United States Patent
Elliot et al.

(10) Patent No.: US 11,416,210 B2
(45) Date of Patent: Aug. 16, 2022

(54) MANAGEMENT OF MEDIA DEVICES HAVING LIMITED CAPABILITIES

(71) Applicant: Sonos, Inc., Santa Barbara, CA (US)

(72) Inventors: Allison Elliot, Seattle, WA (US); Zachary Kramer, Santa Barbara, CA (US); Dmitri Siegel, Ojai, CA (US); Lindsay Whitworth, Santa Barbara, CA (US); Wescott Fleming, Santa Barbara, CA (US); Dane Estes, Seattle, WA (US); Luan Nguyen, Seattle, WA (US); Avram Goldyne, Santa Barbara, CA (US)

(73) Assignee: Sonos, Inc., Santa Barbara, CA (US)

(*) Notice: Subject to any disclaimer, the term of this patent is extended or adjusted under 35 U.S.C. 154(b) by 0 days.

(21) Appl. No.: 16/435,130

(22) Filed: Jun. 7, 2019

(65) Prior Publication Data

US 2020/0387339 A1 Dec. 10, 2020

(51) Int. Cl.
*G06F 3/16* (2006.01)
*H04R 27/00* (2006.01)
(Continued)

(52) U.S. Cl.
CPC .............. *G06F 3/165* (2013.01); *G06F 3/162* (2013.01); *G06F 8/656* (2018.02); *H04R 3/12* (2013.01);
(Continued)

(58) Field of Classification Search
CPC ... G06F 3/16; G06F 9/451; G06F 8/06; G06F 8/60–66; G06F 8/65–66; G06F 3/048;
(Continued)

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

CE Pro Editors. Savant 8.8 Update Includes Savant Music 2.0. Jun. 5, 2018. Ce Pro. https://www.cepro.com/news/savant_8-8_savant_music_app_design/# (Year: 2018).*

(Continued)

*Primary Examiner* — Liang Y Li
(74) *Attorney, Agent, or Firm* — Fortem IP LLP; Benjamin M. Urban

(57) ABSTRACT

Embodiments disclosed herein include managing playback devices with limited capabilities and playback devices with advanced capabilities by way of a control device. In some embodiments, the control device may control a first playback device by way of a legacy control application including a first control interface comprising first playback controls operable to control the first playback device in performing a set of legacy playback functions. The mobile device may control a second playback device by way of a production control application including a second control interface comprising second playback controls operable to control the second playback device in performing a set of production playback functions.

20 Claims, 28 Drawing Sheets

(51) Int. Cl.
*H04R 3/12* (2006.01)
*G06F 8/656* (2018.01)
(52) U.S. Cl.
CPC ....... *H04R 27/00* (2013.01); *H04R 2227/005* (2013.01)
(58) Field of Classification Search
CPC ... G06F 3/162; G06F 3/165; H04R 2227/005; H04R 3/12; H04L 12/2803–2838; H04L 12/2818; H04L 2012/284–285; H04L 41/082; G05B 19/418–41895
See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,085,236 | A * | 7/2000 | Lea .................. H04L 12/281 709/220 |
| 6,256,554 | B1 | 7/2001 | DiLorenzo |
| 6,404,811 | B1 | 6/2002 | Cvetko et al. |
| 6,469,633 | B1 | 10/2002 | Wachter et al. |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang et al. |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington et al. |
| 8,290,603 | B1 * | 10/2012 | Lambourne ......... G06F 3/04855 700/94 |
| 8,483,853 | B1 | 7/2013 | Lambourne |
| 8,942,252 | B2 | 1/2015 | Balassanian et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2006/0239187 | A1 * | 10/2006 | Durand ................. H04W 16/00 370/229 |
| 2007/0142944 | A1 | 6/2007 | Goldberg et al. |
| 2008/0109095 | A1 * | 5/2008 | Braithwaite ..... H04N 21/42203 700/94 |
| 2009/0271507 | A1 * | 10/2009 | Kodimer .................. G06F 8/65 709/224 |
| 2016/0095191 | A1 * | 3/2016 | Vangeel ............... H04B 10/116 315/294 |
| 2016/0170405 | A1 * | 6/2016 | Cargnelli ............. G05B 19/042 700/40 |
| 2019/0044799 | A1 * | 2/2019 | Browne .............. H04L 41/0806 |
| 2019/0049932 | A1 * | 2/2019 | Naidoo ..................... G06F 8/65 |
| 2019/0130734 | A1 * | 5/2019 | Krishnamurthy ... G06F 3/04847 |
| 2020/0042301 | A1 * | 2/2020 | Willis ...................... G06F 8/65 |

OTHER PUBLICATIONS

Sparrow, Mark. "Yamaha Brings Apple Airplay2, New Muse Streaming and Voice Updates Control Via Free Firmware Updates". Forbes. Apr. 16, 2019. <https://www.forbes.com/sites/marksparrow/2019/04/16/yamaha-brings-apple-airplay2-new-music-streaming-and-voice-control-via-free-firmware-updates> (Year: 2019).*
Stieben, Danny. "5 Reaons Why You Should Update Your Kernel Often". May 7, 2012. MakeUseOf. https://www.makeuseof.com/tag/5-reasons-update-kernel-linux/ (Year: 2012).*
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth "Specification of the Bluetooth System: The ad hoc Scatternet for affordable and highly functional wireless connectivity," Core, Version 1.0 A, Jul. 26, 1999, 1068 pages.
Bluetooth "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

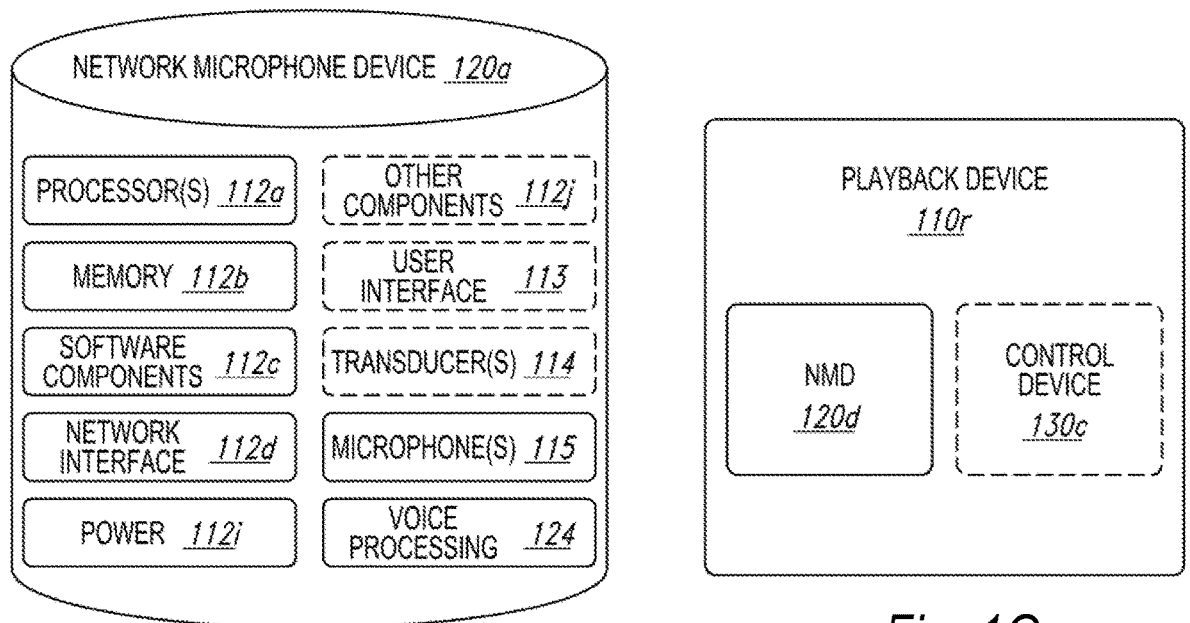
Fig. 1F
Fig. 1G
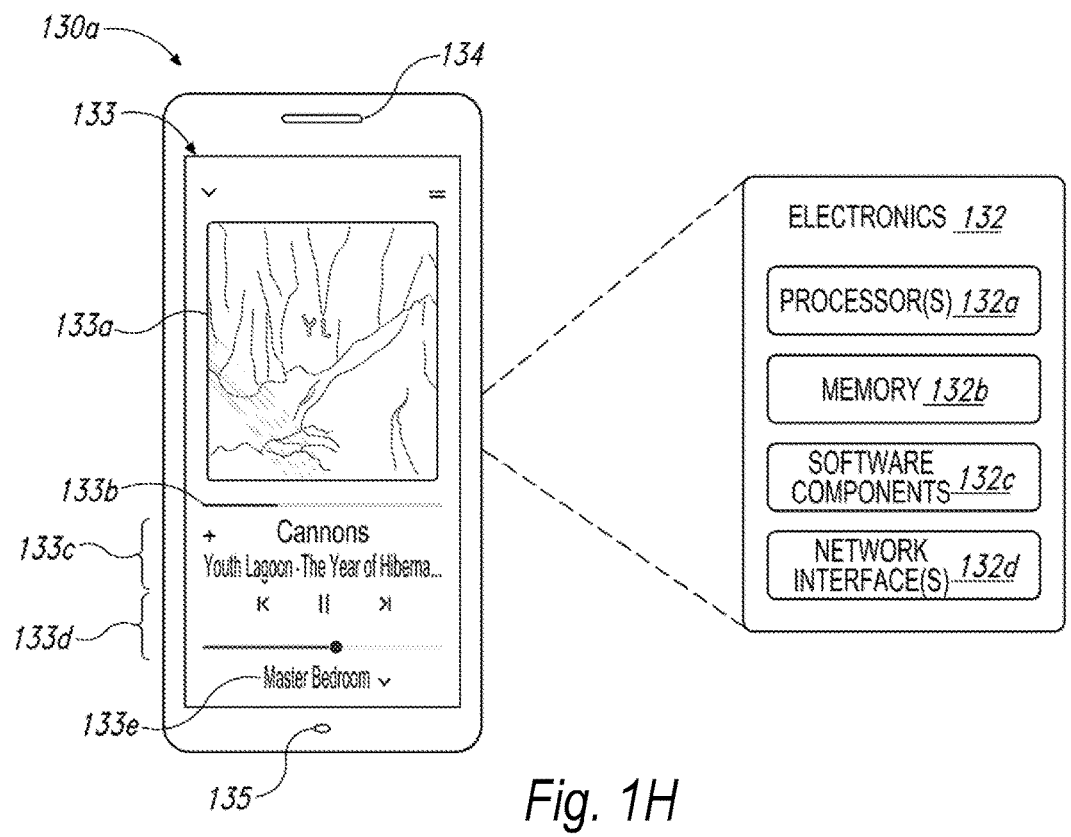
Fig. 1H

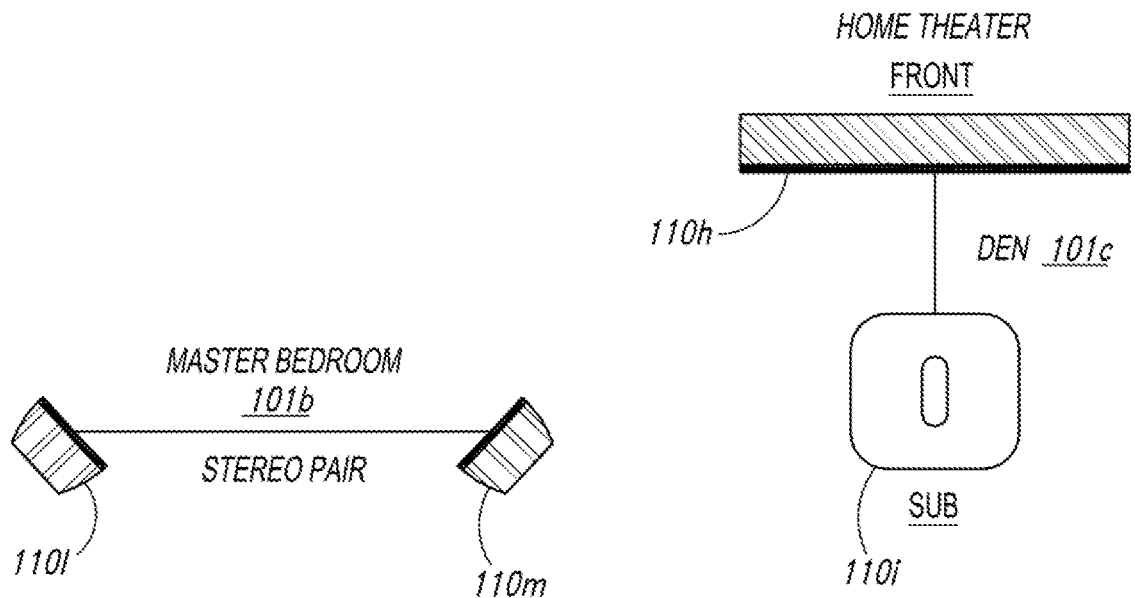
Fig. 1I
Fig. 1J
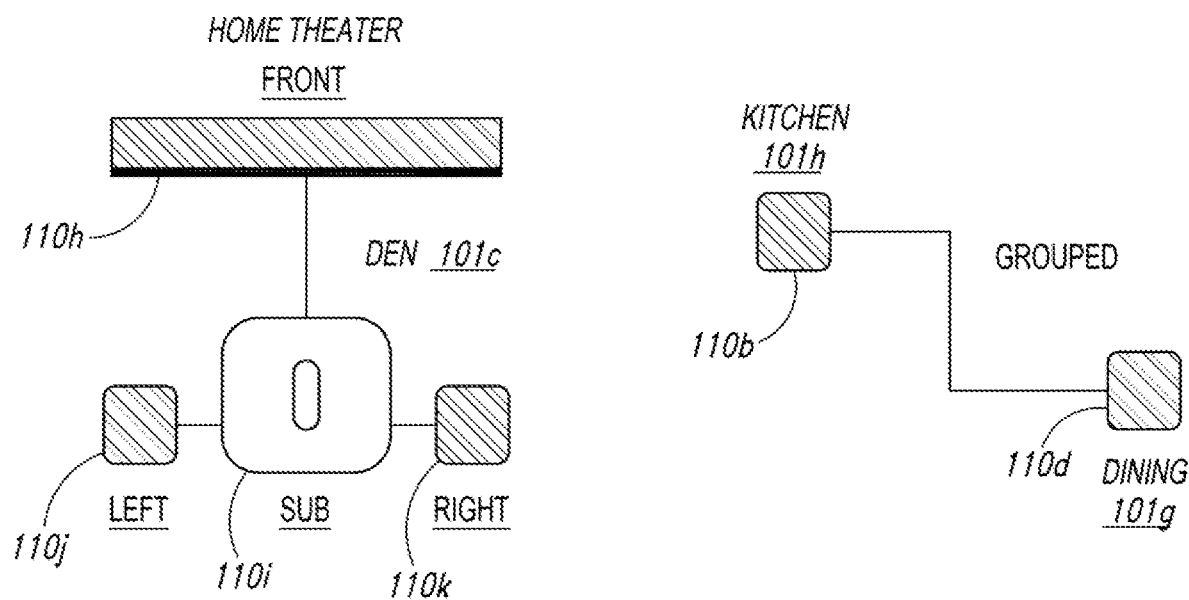
Fig. 1K
Fig. 1L

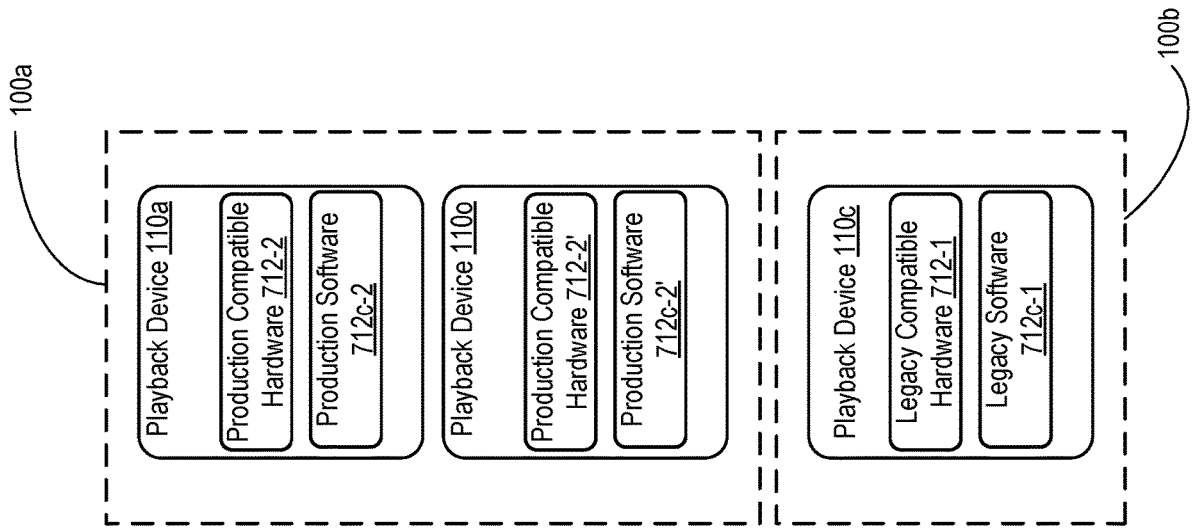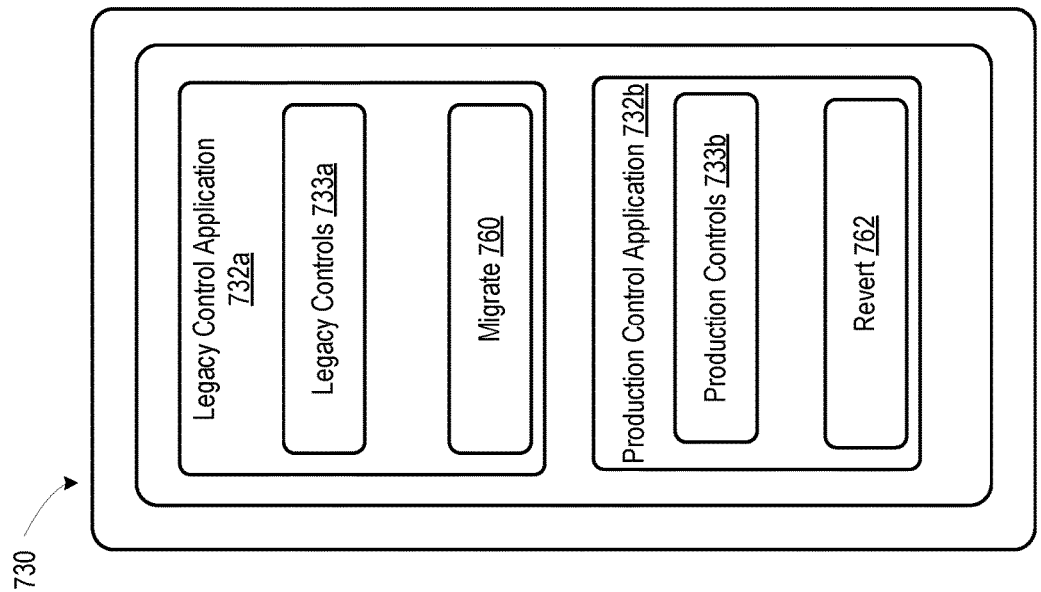
Fig. 7C

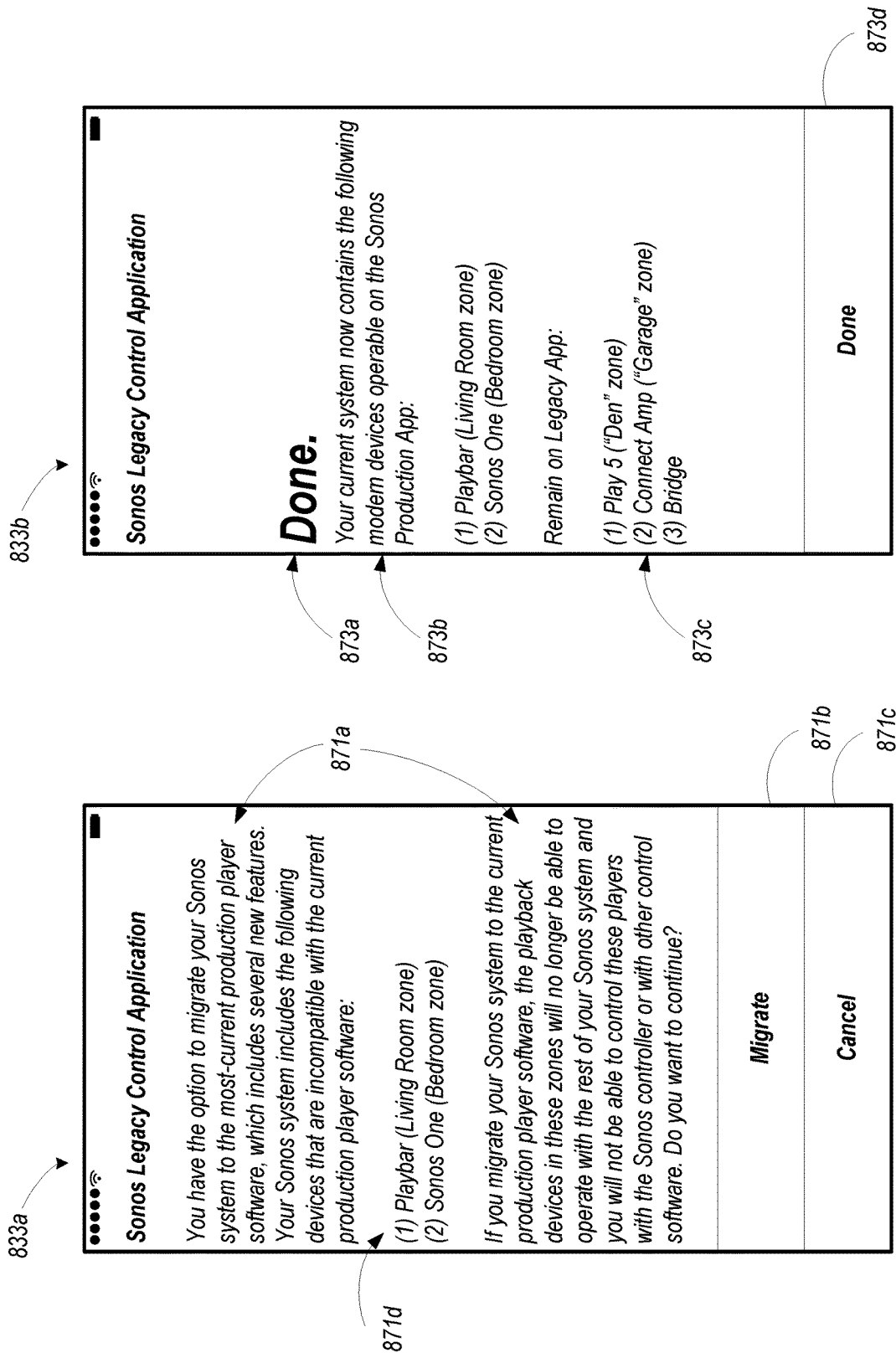

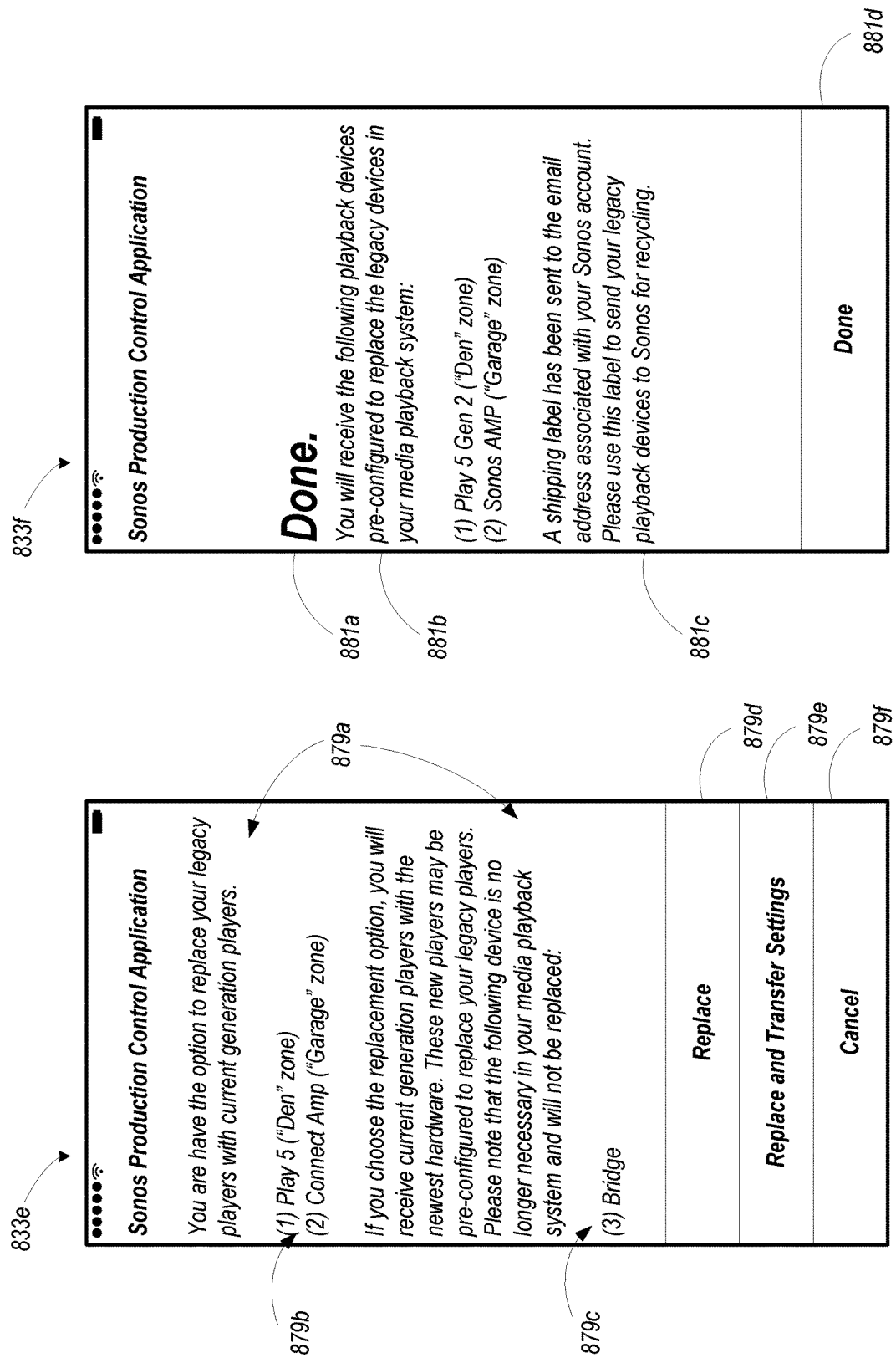

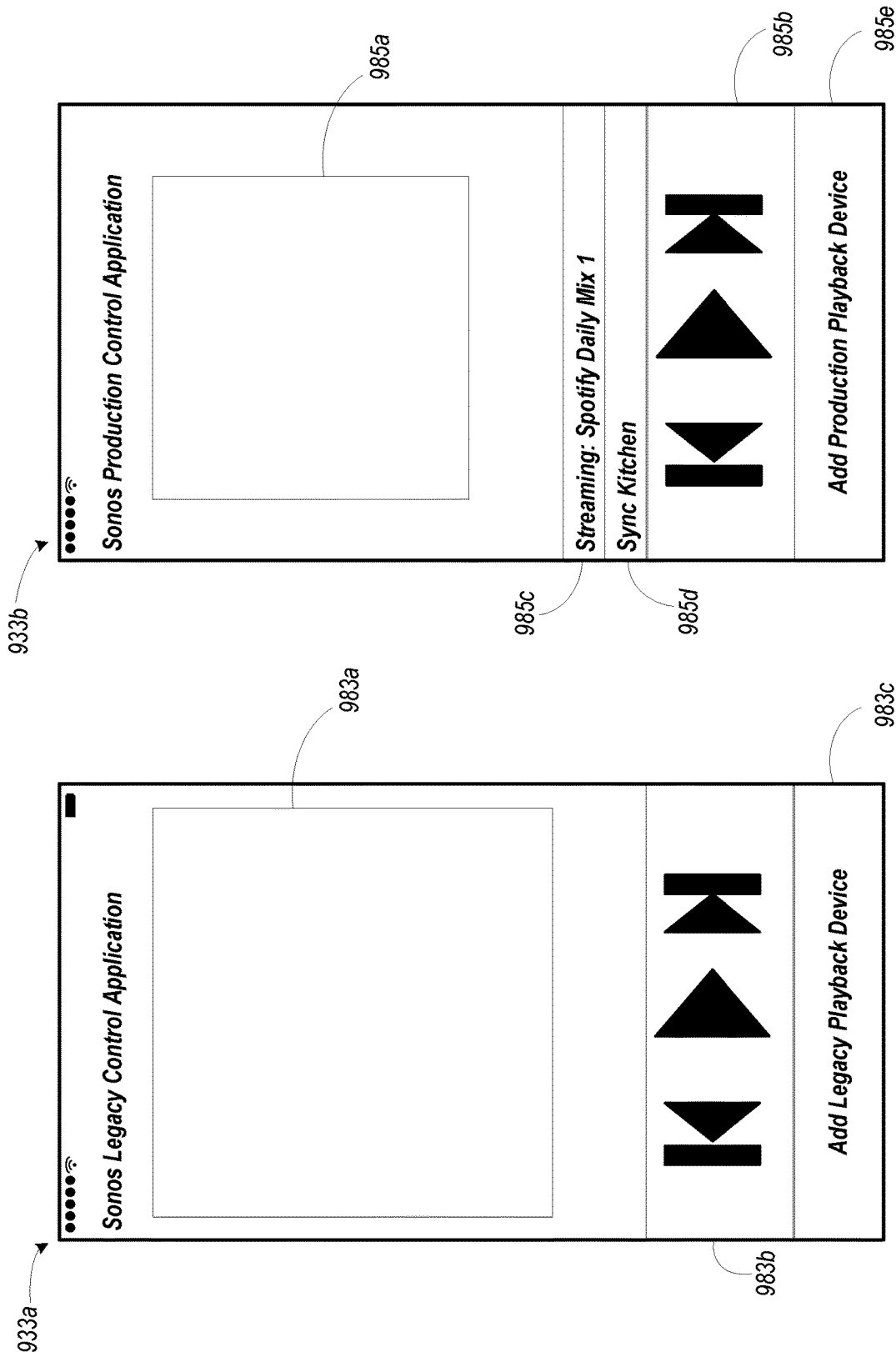

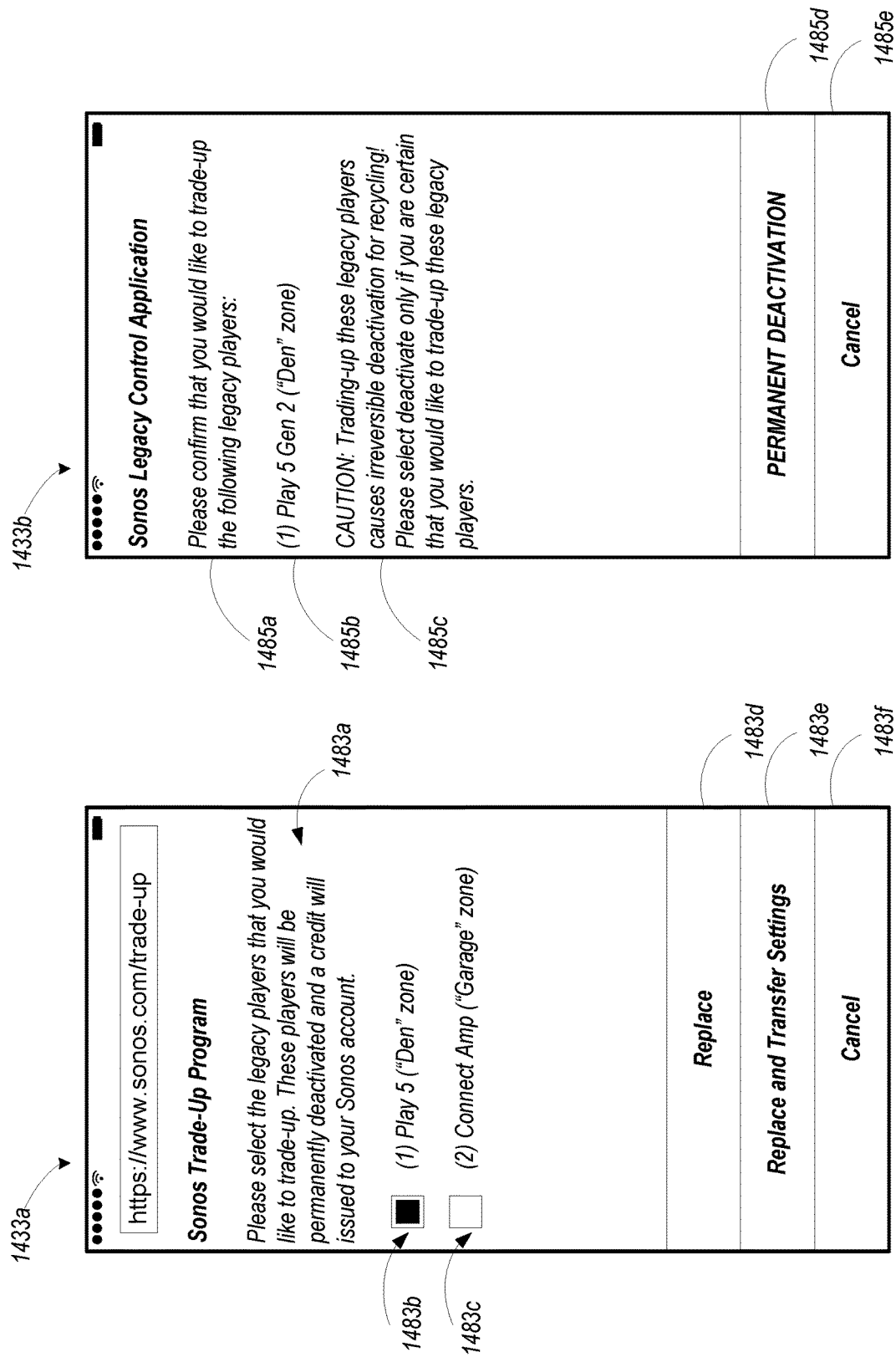

MANAGEMENT OF MEDIA DEVICES HAVING LIMITED CAPABILITIES

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partially schematic diagram of a control device.

FIGS. 1-I, 1J, 1K, and 1L are schematic diagrams of corresponding media playback system zones.

FIGS. 7A, 7B, 7C, and 7D are block diagrams of migration systems, according to example embodiments.

FIGS. 8A, 8B, 8C, 8D, 8E, and 8F are example user interfaces in accordance with aspects of this disclosure.

FIGS. 9A and 9B are example user interfaces in accordance with aspects of this disclosure.

FIGS. 14A and 14B are example user interfaces in accordance with aspects of this disclosure.

Figure 1A:
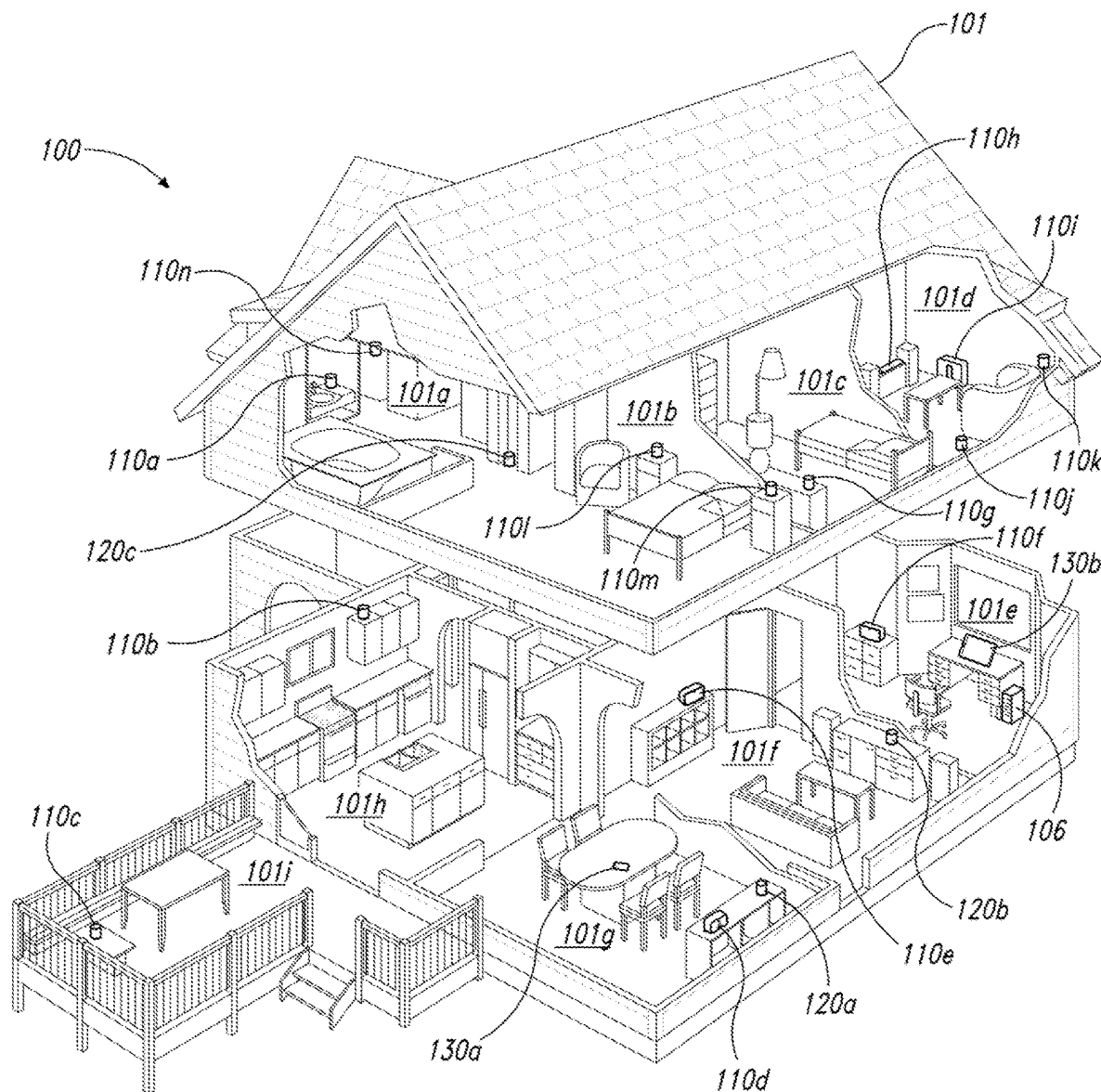
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Example techniques described herein relate to managing new and legacy playback devices in a media playback system. Example media playback systems described herein involve zone-based systems of networked playback devices that coordinate in performing playback and associated functions, such as synchronous playback of streaming audio content. Further, computing devices, such as smartphones, tablets, and laptops, among other examples, may execute control applications, which then operate as control devices configured to control operations of the playback devices over a network.

One advantage of example media playback systems described herein is the ability to upgrade playback devices with new player software that includes new features and/or fixes. The player software includes instructions to configure the playback devices in performing playback and associated functions. By upgrading the player software, prior generation playback devices may maintain compatibility with newer generation playback devices, which helps to prolong the useful operating life of prior generation playback devices. For discussions herein, prior generation playback devices may refer to playback devices that were designed and shipped with different, usually fewer, features and functionalities than playback devices designed and shipped thereafter, i.e. current or newer generation playback devices. Users may add playback devices of different generations to the same media playback system, which facilitates building up a media playback system in various zones (e.g., rooms) of the home over time. To maintain interoperability, the playback devices and/or the control devices of the media playback system may require software compatibility (e.g., the same or similar software versions) in the player software installed on each playback device and in the control applications on each control device.

As technology for controlling and operating playback devices and media playback systems advances, current generation playback devices (referred to herein as "production playback devices") may be manufactured with additional and/or improved hardware relative to prior generation playback devices. Due to these changes, prior generation playback devices may have limited capabilities relative to these production playback devices. Over time, the changes from generation to generation may compound, leaving playback devices that are several generations behind the production playback devices (referred to herein as "legacy playback devices") with significantly less hardware capabilities. In some cases, the player software is unable to take advantage of the additional and/or improved hardware of production playback devices while maintaining compatibility with legacy playback devices.

As noted above, example techniques described herein relate to managing legacy playback devices in a media playback system. One example technique may involve a cloud-assisted trade-up of a legacy playback device for a production playback device including transfer of settings on the legacy playback device to the production playback device. This technique may further involve deactivation of the legacy playback device. Another example technique may include maintaining parallel media playback systems including production and legacy playback devices, respectively. A further technique may include enforcing limitations on the legacy playback devices and offloading that functionality to a production playback device or the cloud. For instance, in a media playback system that includes both production and legacy playback devices, the legacy playback devices might not be able to operate as group coordinators of a synchrony group, but can instead operate as group members of the synchrony group when a production playback device is operating as group coordinator.

In an example implementation, a mobile device displays, via a legacy control application installed on the mobile device, a first control interface comprising first playback controls operable to control the first playback device in performing a set of legacy playback functions. The first playback device includes legacy player software compatible with the set of legacy playback functions supported by the legacy control application. Additionally, the first playback device is hardware-compatible with production player software compatible with a set of production playback functions supported by a production control application. Further, the legacy playback functions are a subset of the production playback functions. The mobile device receives, via the first playback controls of the displayed first control interface, input data representing a command to perform a first legacy playback function. The mobile device sends, via a network interface to the first playback device, instructions to perform the first legacy playback function. Additionally, the mobile device displays, via the legacy control application installed on the mobile device, a second control interface comprising second playback controls operable to control the second playback device in performing the set of legacy playback functions, wherein the second playback device comprises the legacy player software compatible with the set of legacy playback functions supported by the legacy control application, and wherein the second playback device is hardware-compatible with the legacy player software and hardware-incompatible with the production player software. Additionally, the mobile device may receive, via the second playback controls of the displayed second control interface, input data representing a command to perform a second legacy playback function. The mobile device sends, via a network interface to the second playback device, instructions to perform the second legacy playback function.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., playback device 110a) in synchrony with a second playback device (e.g., the playback device 110b). Interactions between the playback devices 110, NMDs 120, and/or control devices 130 of the media playback system 100 configured in accordance with the various embodiments of the disclosure are described in greater detail below with respect to FIGS. 1B-6.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the outdoor patio 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E and 1I-1M.

In some aspects, one or more of the playback zones in the environment 101 may each be playing different audio content. For instance, a user may be grilling on the outdoor patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the outdoor patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
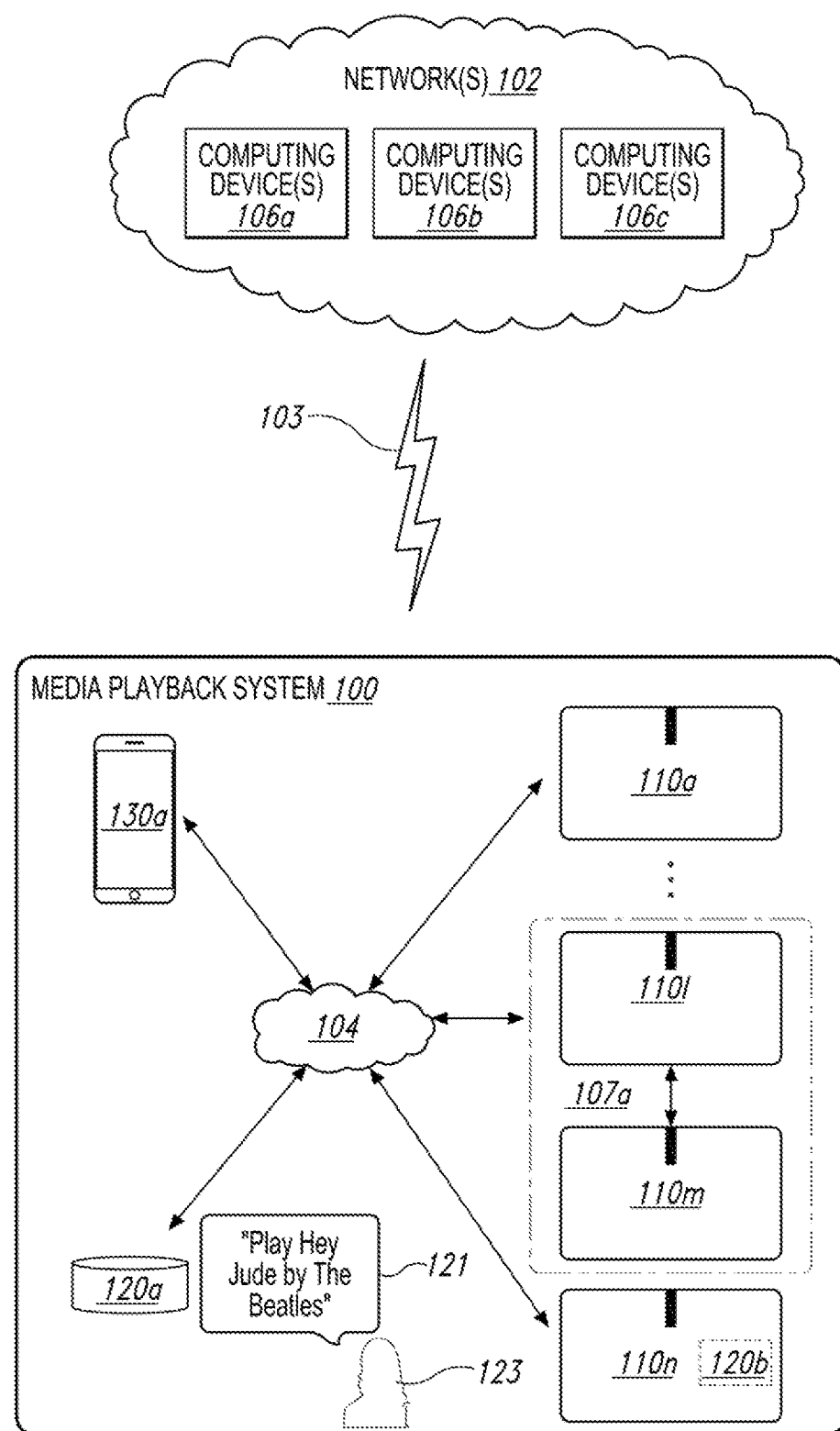
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a comprises a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110. Additional details regarding groups and other arrangements of playback devices are described in further detail below with respect to FIGS. 1-I through IM.

The media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) transmit a corresponding command to the media playback system 100. In some aspects, for example, the computing device 106c comprises one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103. In response to receiving the voice input data, the computing device 106c processes the voice input data (i.e., "Play Hey Jude by The Beatles"), and determines that the processed voice input includes a command to play a song (e.g., "Hey Jude"). The computing device 106c accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
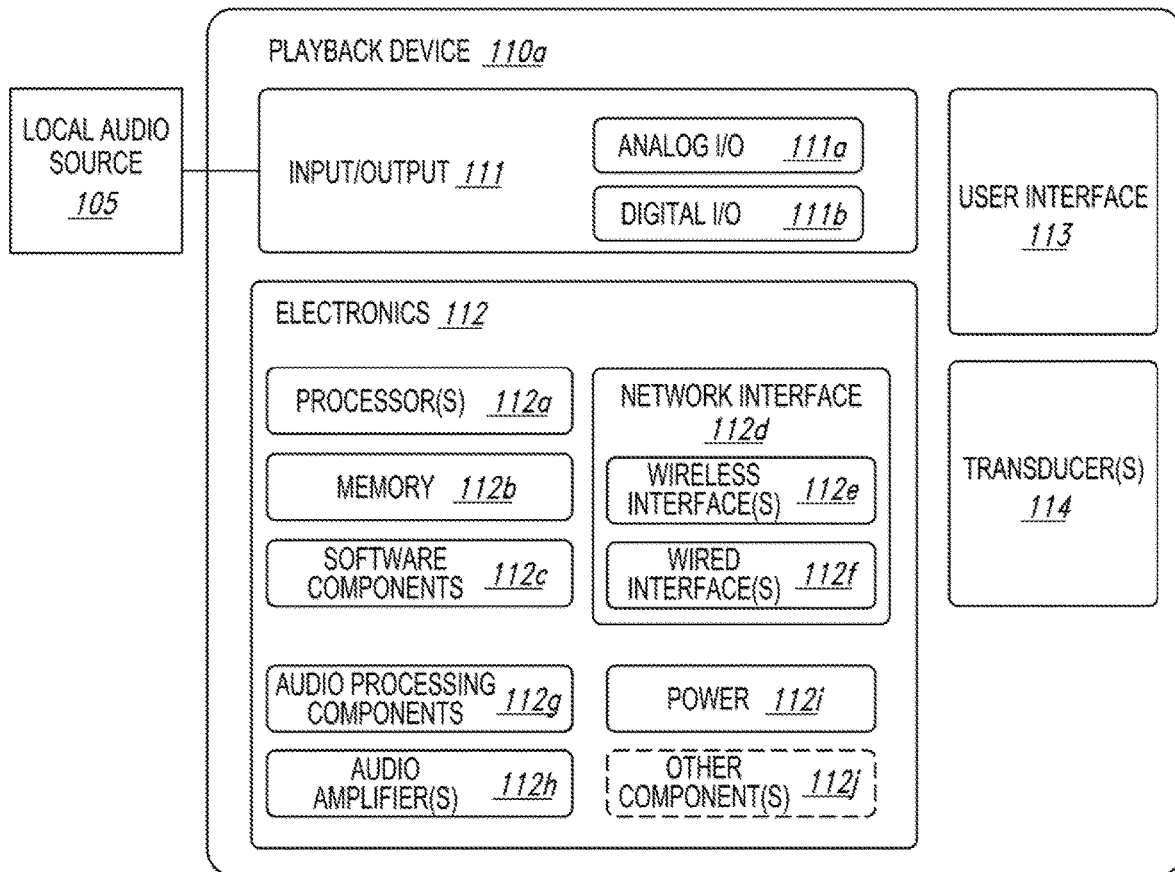
FIG. 1C is a block diagram of a playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises an High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The software components 112c may be referred to herein as "player software," which refers collectively to an operating system, drivers, and/or application software. The player software is upgradeable to new versions (e.g., a new kernel or driver, or a revision of the application software). Software upgrades facilitate interoperability between playback devices of different models and/or generations.

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Referring to FIGS. 1A and 1C together, the playback devices 110a-n include playback devices of different types. For instance, the playback devices 110a, 110b, 110c, 110g, 110j, 110k, 110l, 110m, and 110n are a first type of playback device (i.e., a playback device in the form factor of a small bookshelf speaker). The playback devices 110d, 110e, and 110f are a second type of playback device (e.g., a playback device in the form factor of a large bookshelf speaker). The playback device 110h and playback device 110i are a third type and fourth type of playback device, respectively. In particular, the playback device 110h is a playbar type playback device while the playback device 110i is a subwoofer type playback device.

Generally, playback devices of different types may include similar input/output 111, electronics 112, and user interface 113. The size, type, and physical arrangement of the transducers 114 may vary by type. For instance, the playback devices 110a, 110b, 110c, 110g, 110j, 110k, 110l, 110m, and 110n, which are the first type of playback device, include relatively smaller woofers than the playback devices 110d, 110e, and 110f, which are the second type of playback device. Further, the playback device 110h may include a plurality of small woofers, to facilitate creating multiple audio channels.

The playback devices 110a-n may further include playback devices of different generations. New generation playback devices may include relatively faster and/or more capable input/output 111, electronics 112, and/or user interface 113 relative to prior generation playback devices. For example, some playback devices may include processors 112a with greater processing power and/or memory 112b with more available storage than other playback devices. Further, new generation playback devices may include additional hardware to support features, such as integrated voice control, that are not necessarily support by the hardware in prior generation playback devices. Playback devices of different types released in same generation may share some of the same or similar hardware components, which may lessen development costs.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "BEAM," "AMP," "CONNECT," and "SUB." Other suitable playback devices may additionally or alternatively be used to implement the playback devices of example embodiments disclosed herein. Additionally, one of ordinary skill in the art will appreciate that a playback device is not limited to the examples described herein or to SONOS product offerings.

By way of illustration, a later generation "SONOS ONE" may include hardware capable of executing more advanced functions than, for example, an earlier generation "PLAY-BAR". For instance, a "SONOS ONE" player may include hardware and software that supports newer protocols, such as Apple Airplay 2®, whereas the software and hardware capabilities of a "PLAY 5" might not. Further, a "SONOS ONE" player may include hardware capable of receiving and parsing voice input, whereas other playback devices may not include hardware with these capabilities.

Figure 1D:
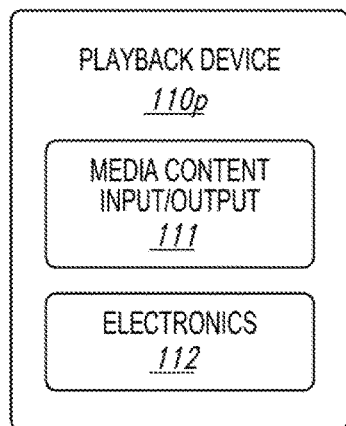
FIG. 1D is a block diagram of a playback device.

In some embodiments, for example, one or more playback devices 110 comprise wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
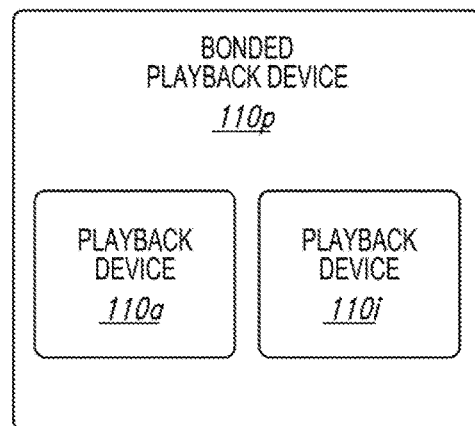
FIG. 1E is a block diagram of a bonded playback device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

e. Suitable Playback Device Configurations

Figure 1M:
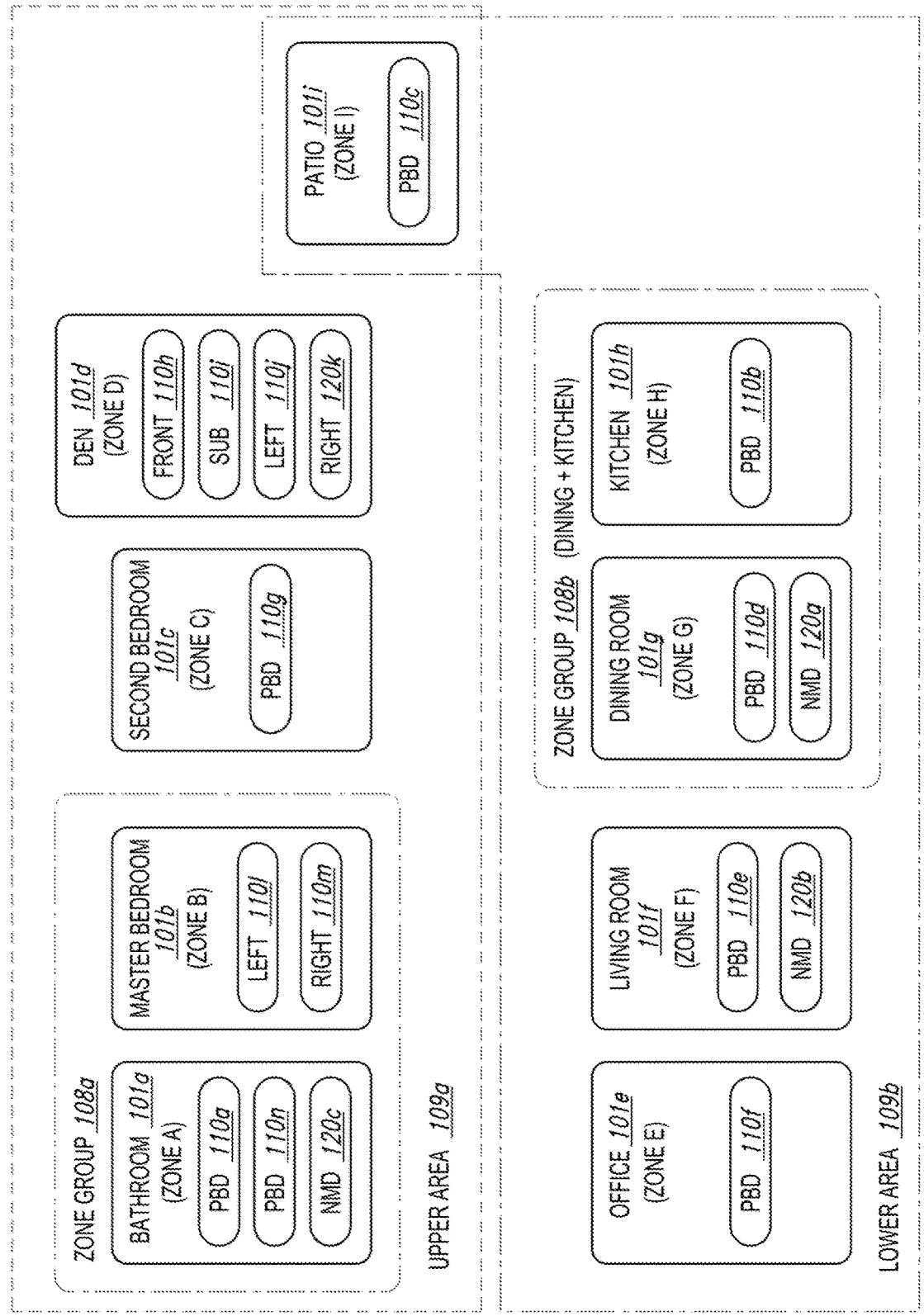
FIG. 1M is a schematic diagram of media playback system areas.

FIGS. 1-1 through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 102k can be configured to form surround or "satellite" channels of a home theater system. The bonded playback devices 110h, 110i, 110j, and 110k may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110a and 110n the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 1M. In some embodiments, a zone group may be given a unique name selected by a user.

Certain data may be stored in a memory of a playback device (e.g., the memory 112c of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-

110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
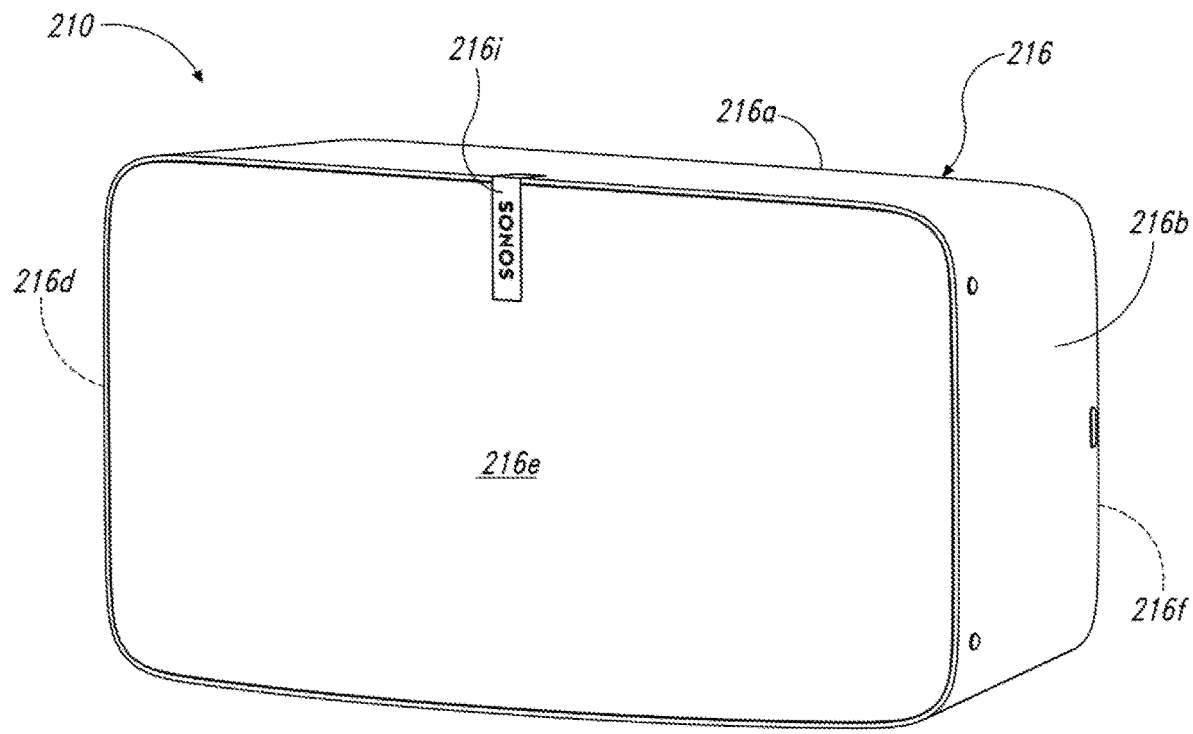
FIG. 2A is a front isometric view of a playback device configured in accordance with aspects of the disclosed technology.
Figure 2B:
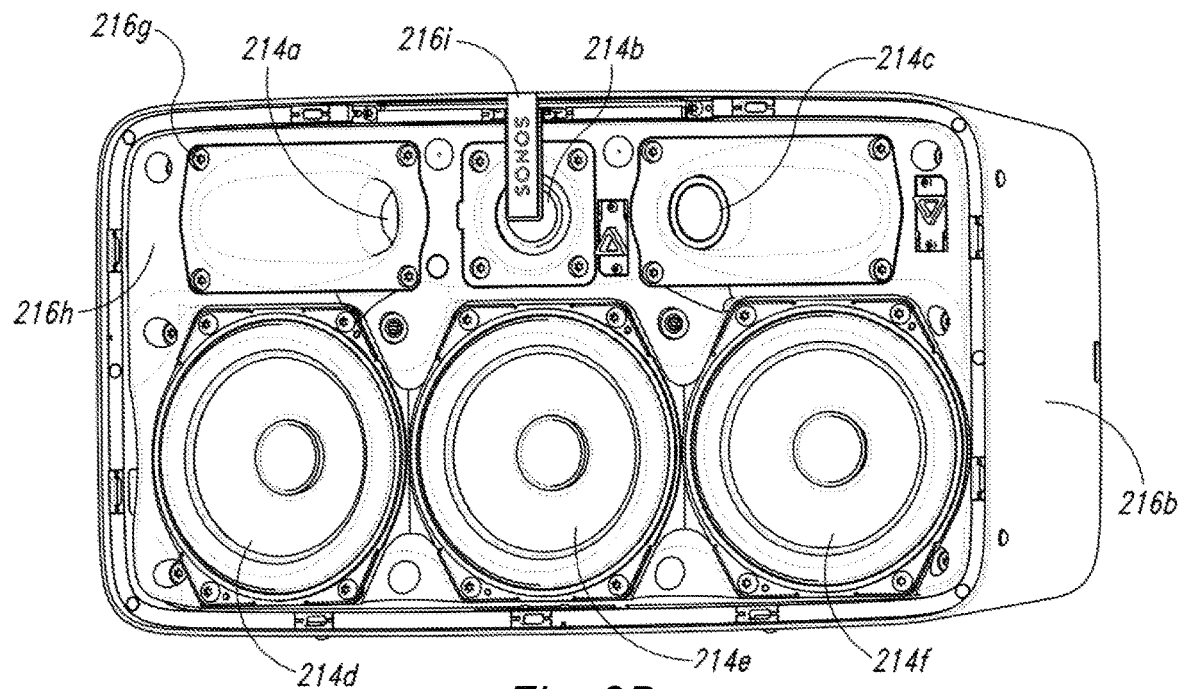
FIG. 2B is a front isometric view of the playback device of FIG. 3A without a grille.
Figure 2C:
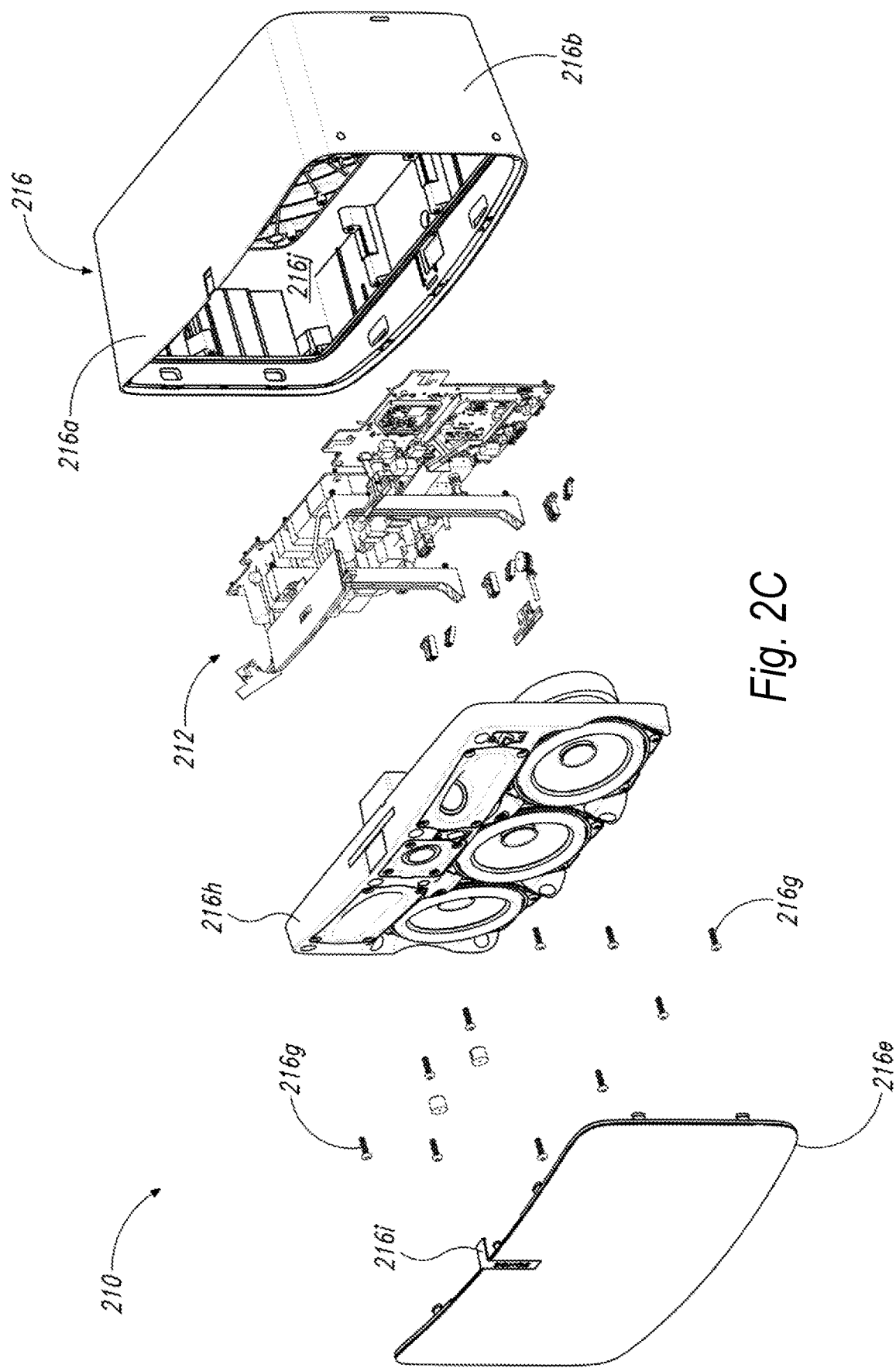
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
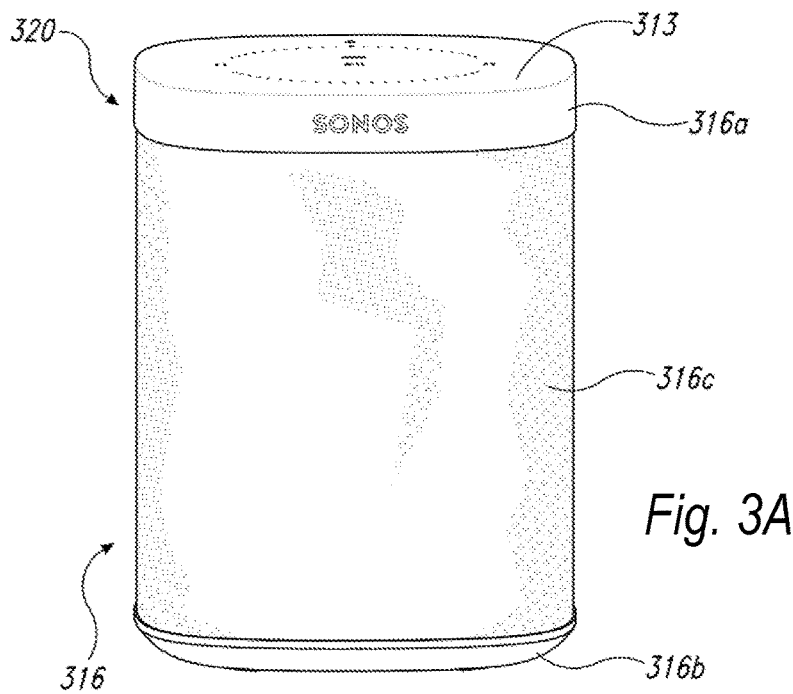
FIG. 3A is a front view of a network microphone device configured in accordance with aspects of the disclosed technology.
Figure 3B:
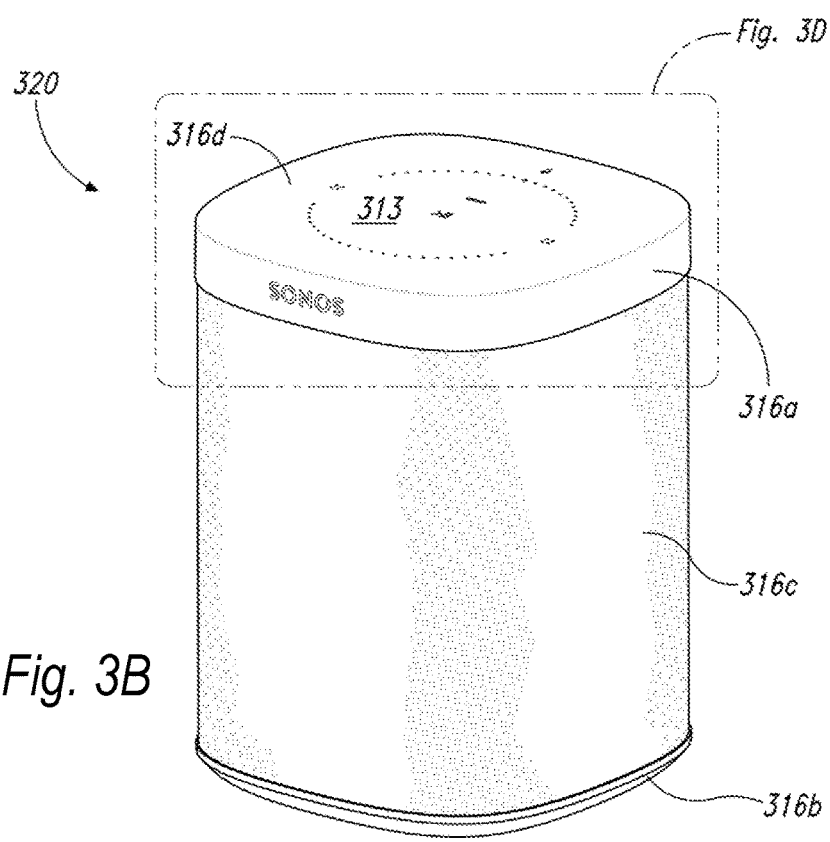
FIG. 3B is a side isometric view of the network microphone device of FIG. 3A.
Figure 3C:
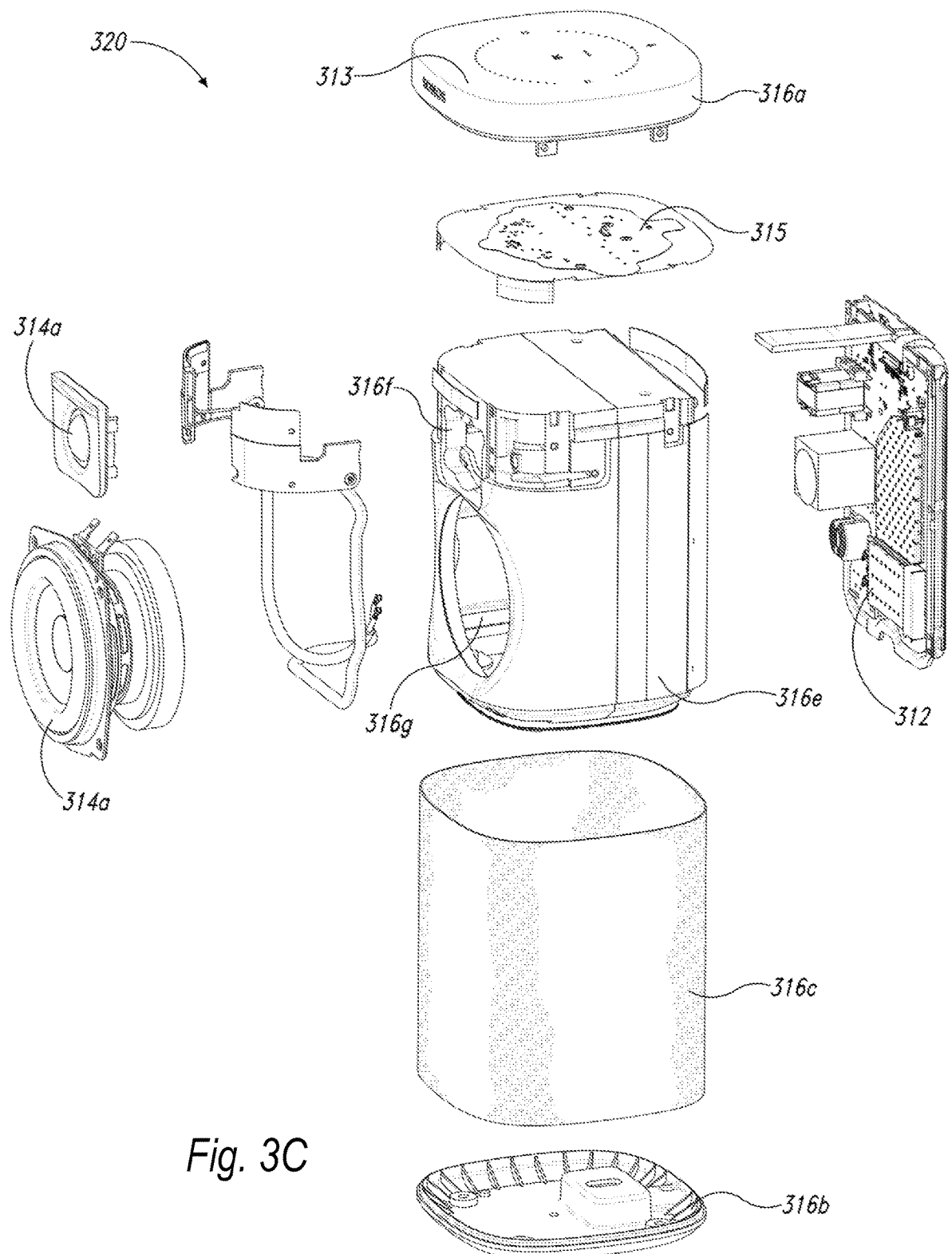
FIG. 3C is an exploded view of the network microphone device of FIGS. 3A and 3B.
Figure 3D:
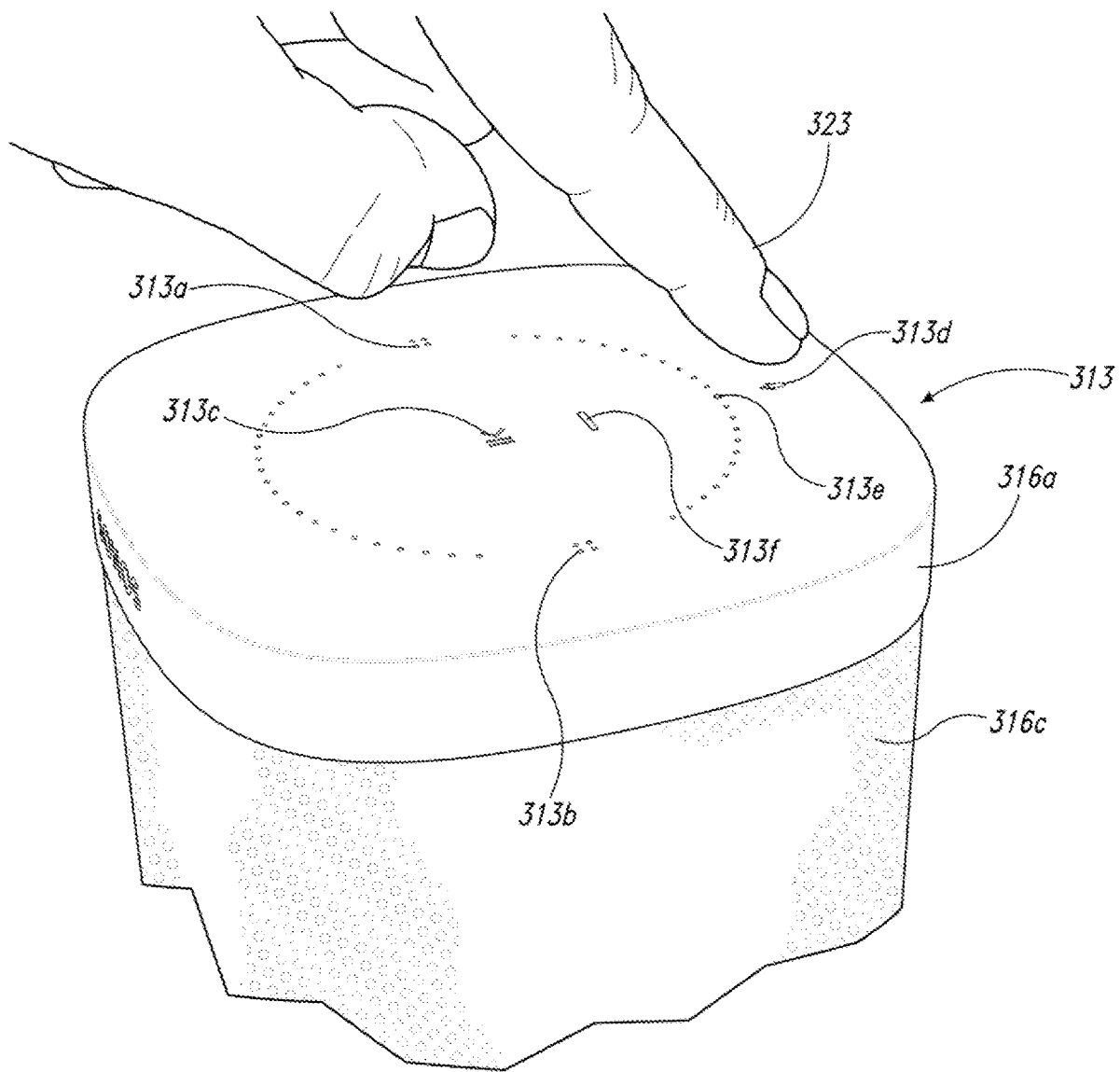
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 316 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
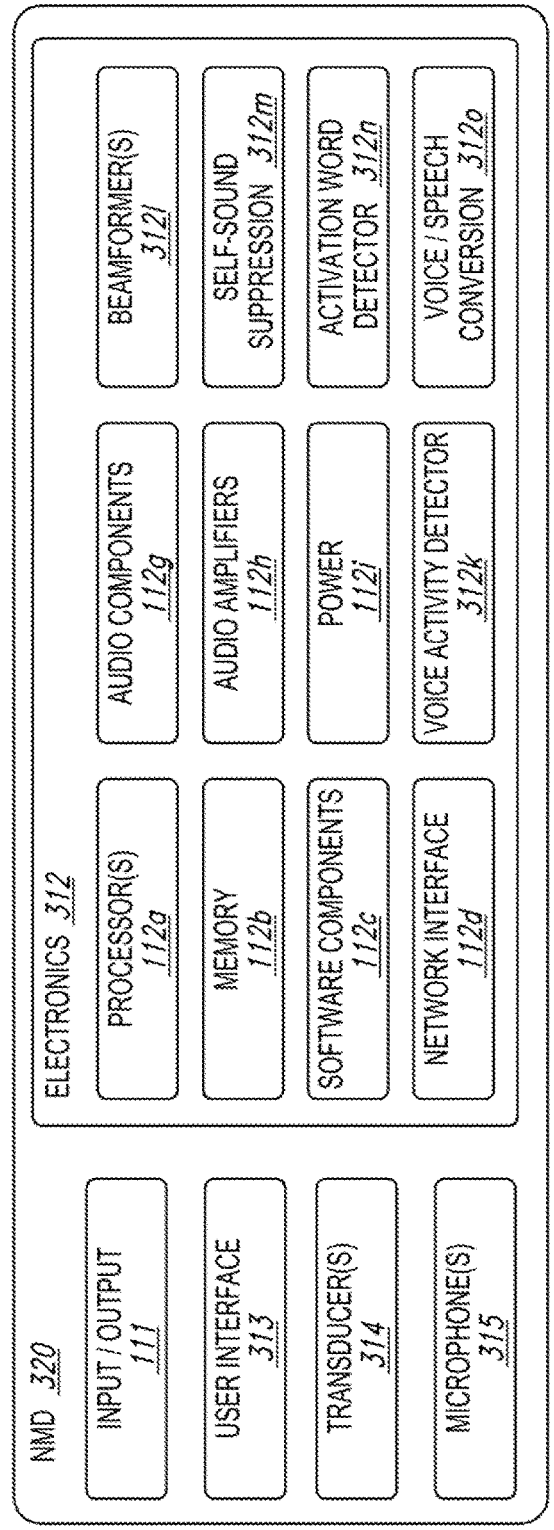
FIG. 3E is a block diagram of the network microphone device of FIGS. 3A-3D

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components 312l and 312m are configured to detect an audio signal and determine aspects of voice input represented in the detected audio signal, such as the direction, amplitude, frequency spectrum, etc. The voice activity detector activity components 312k are operably coupled with the beamforming and AEC components 312l and 312m and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise.

The activation word detector components 312n are configured to monitor and analyze received audio to determine if any activation words (e.g., wake words) are present in the received audio. The activation word detector components 312n may analyze the received audio using an activation word detection algorithm. If the activation word detector 312n detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
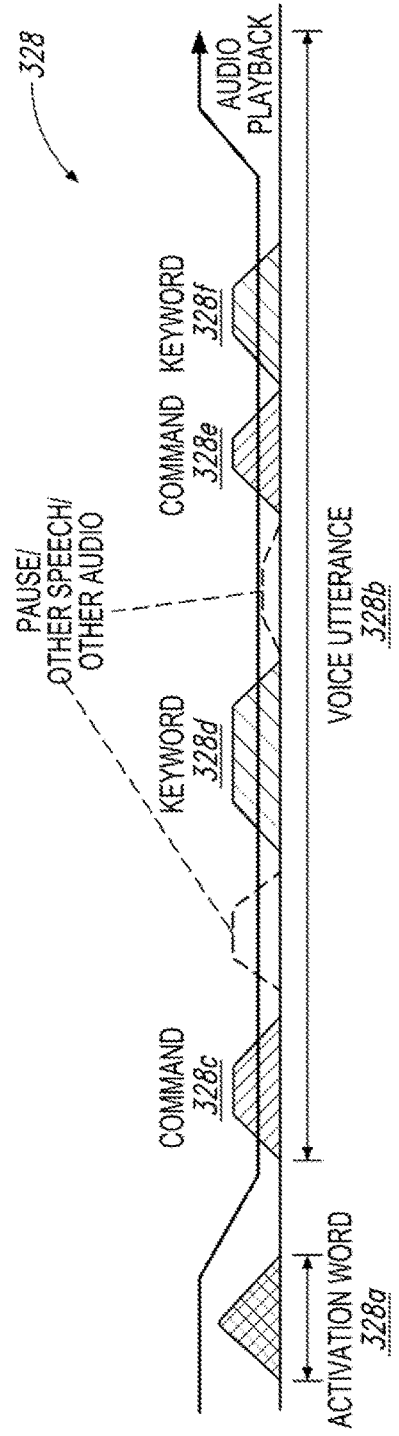
FIG. 3F is a schematic diagram of an example voice input.

FIG. 3F is a schematic diagram of an example voice input 328 captured by the NMD 320 in accordance with aspects of the disclosure. The voice input 328 can include a activation word portion 328a and a voice utterance portion 328b. In some embodiments, the activation word 557a can be a known activation word, such as "Alexa," which is associated with AMAZON's ALEXA®. In other embodiments, however, the voice input 328 may not include a activation word. In some embodiments, a network microphone device may output an audible and/or visible response upon detection of the activation word portion 328a. In addition or alternately, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 328f). In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figure 4A:
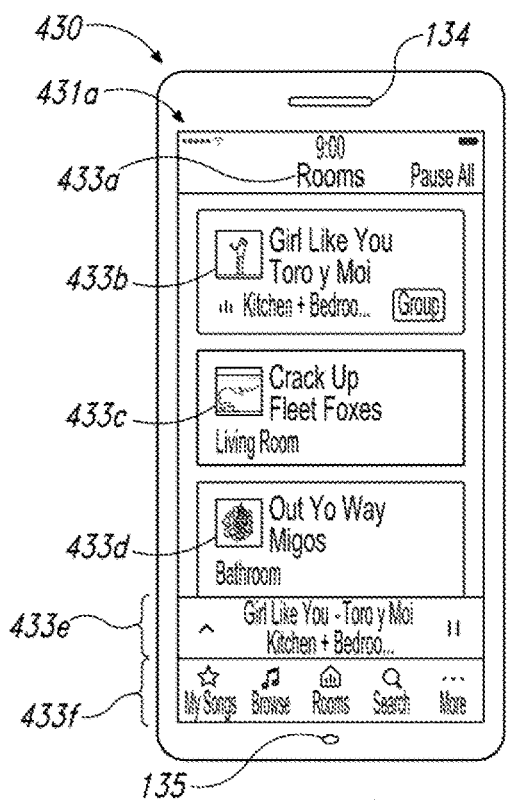
FIGS. 4A, 4B, 4C, and 4D are schematic diagrams of a control device in various stages of operation in accordance with aspects of the disclosed technology.
Figure 4B:
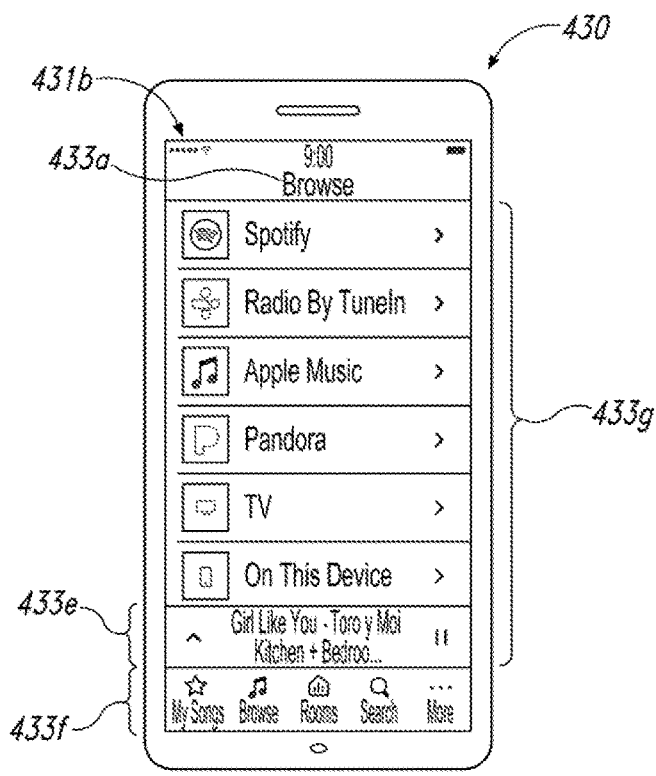
Figure 4C:
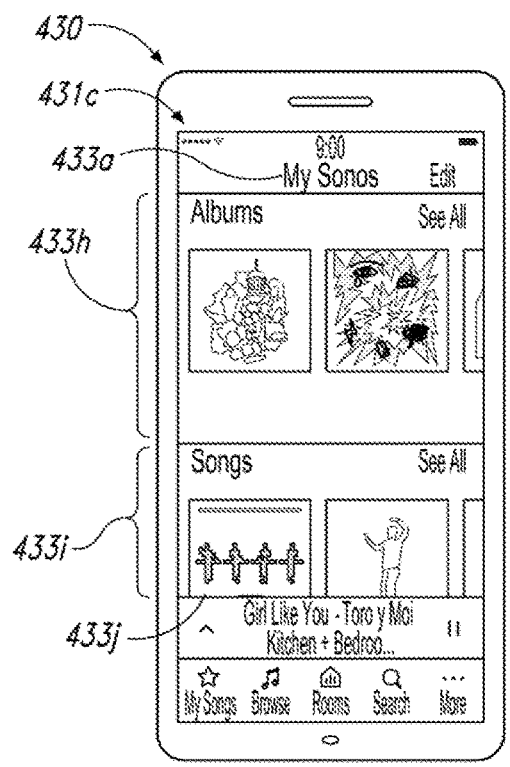
Figure 4D:
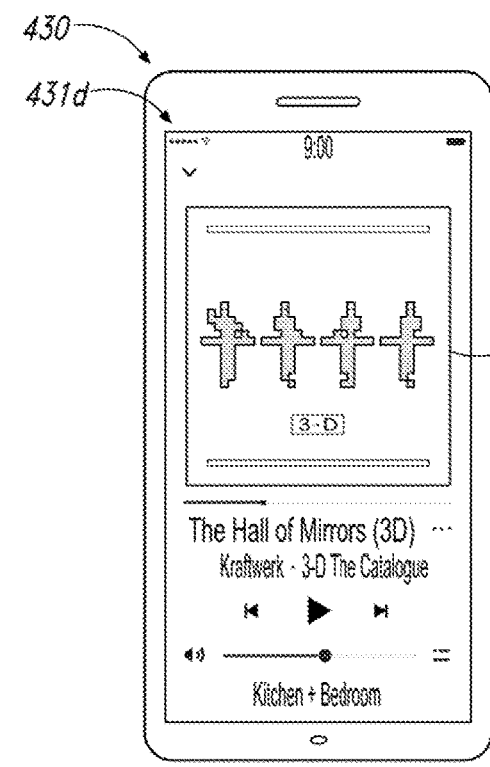

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
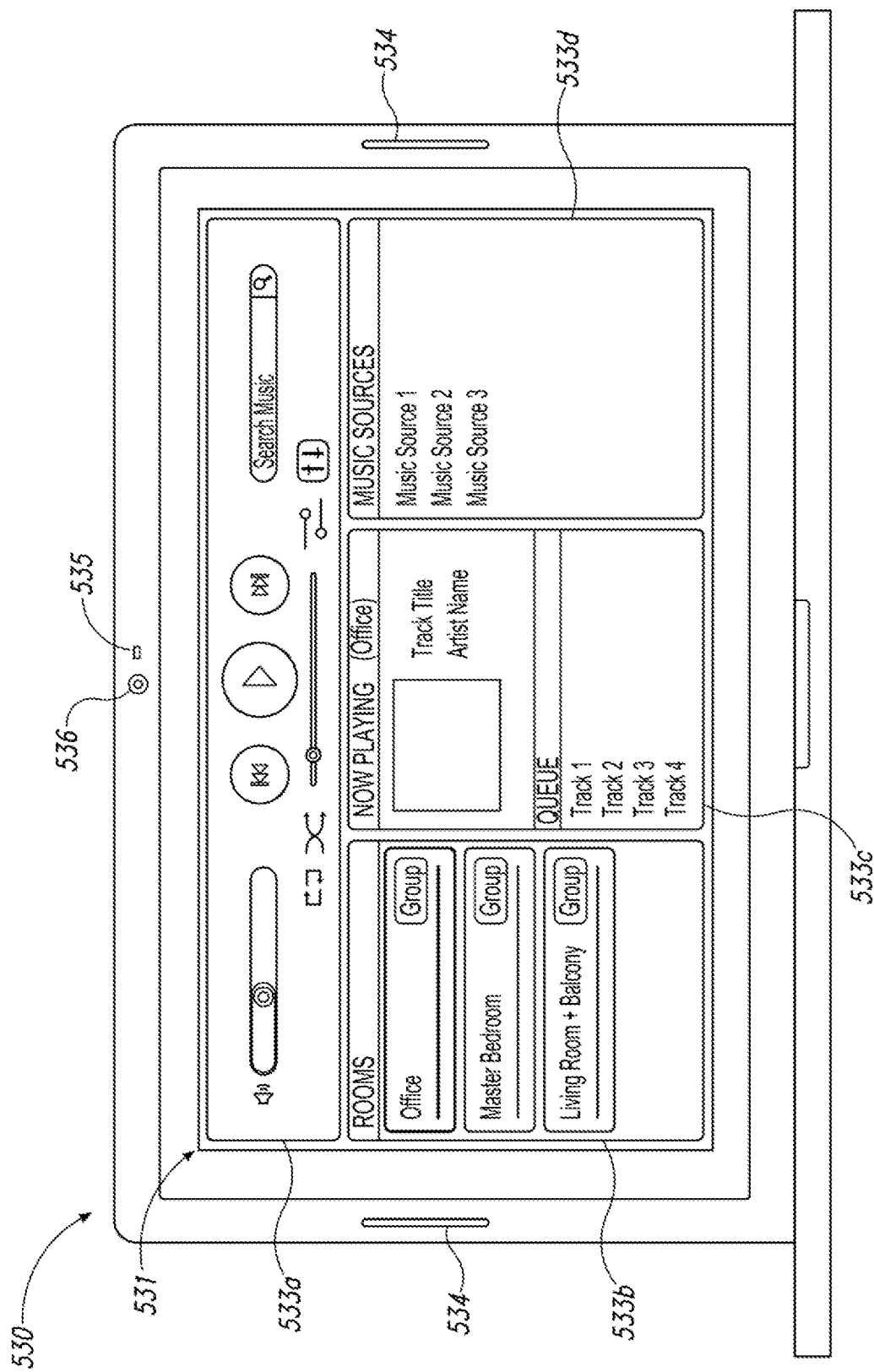
FIG. 5 is front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
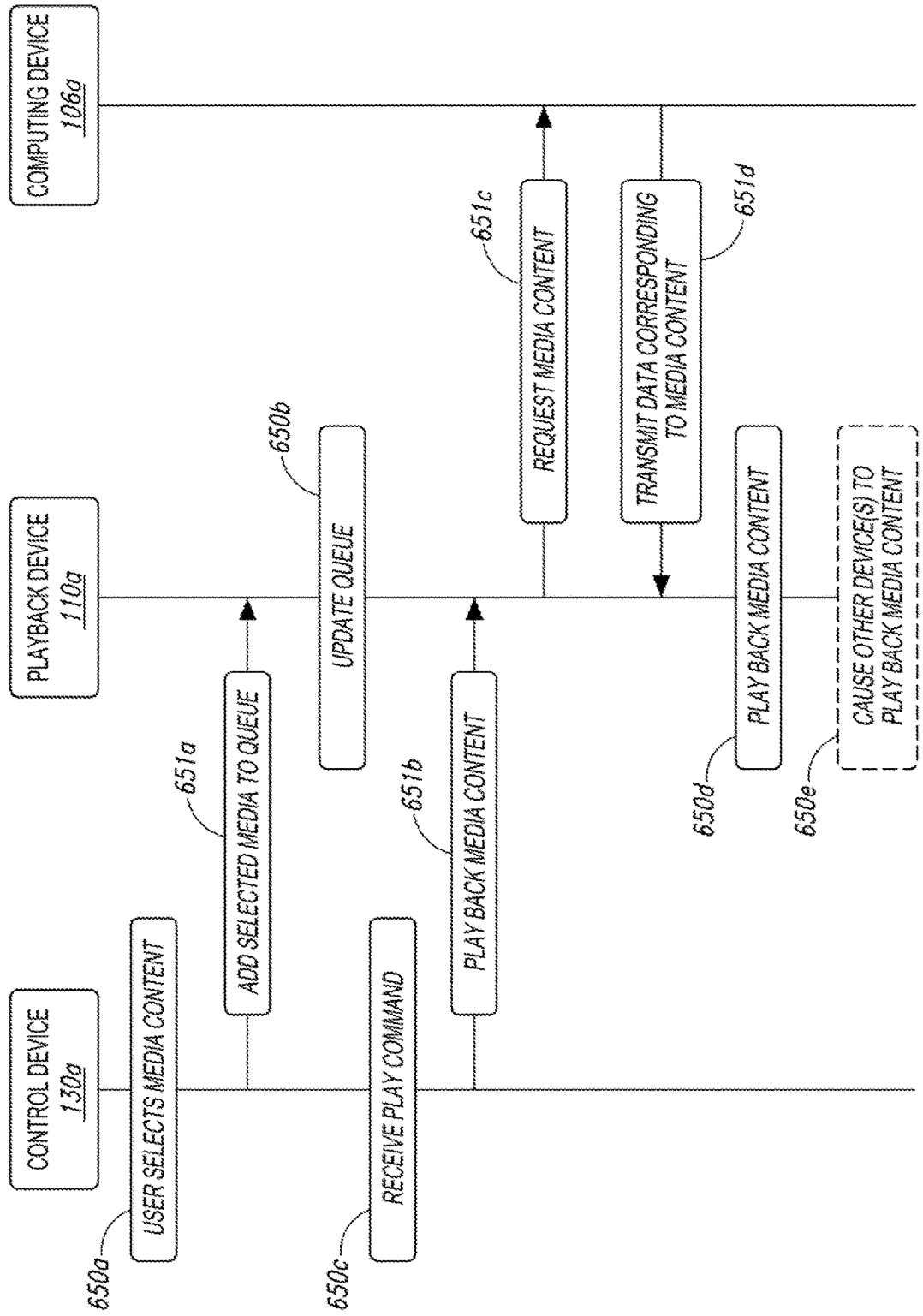
FIG. 6 is a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on one or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the computing device 106a requesting the selected media content. The computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more playback devices (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the computing device 106a, and begin playback of the selected media content in response to a message from the playback device 110a such that all of the devices in the group play back the selected media content in synchrony.

IV. Managing Media Devices Having Limited Capabilities

As noted above, capabilities of example playback devices may vary by generation. Over time, the changes from generation to generation may compound, leaving legacy playback devices with significantly less hardware capabilities than current and/or newer generation playback devices. In some cases, the player software is unable to take advantage of the additional and/or improved hardware of production playback devices while maintaining compatibility with legacy playback devices.

As such, it may be desirable to operate one or more legacy playback devices independently of current generation production playback devices. Separate legacy and production player software may be created to account for the different capabilities of playback devices. Further, legacy and production control applications may be developed to facilitate control interactions with the legacy and production playback devices. Newer generation production playback devices having hardware compatibility with the production software may be migrated from the legacy software to the production software, while legacy playback devices that are hardware incompatible with the production software continue to operate with the legacy software. In some implementations, both legacy playback devices and production playback devices are operable on a singular control device (e.g., a mobile device) by way of separate legacy and production control applications or via different portions of a single application.

a. Media Playback System Migration

Figure 7A:
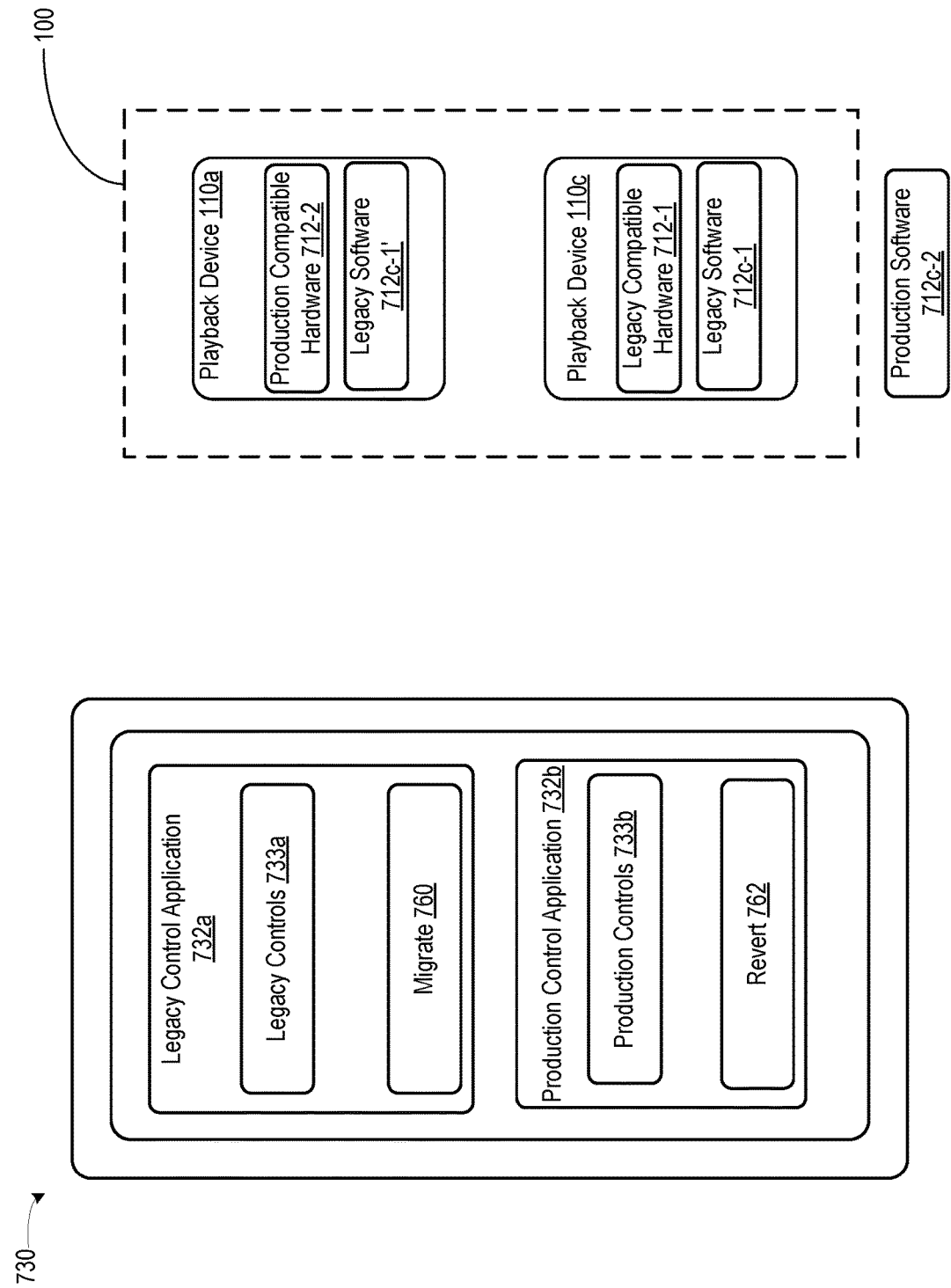
Figure 7B:
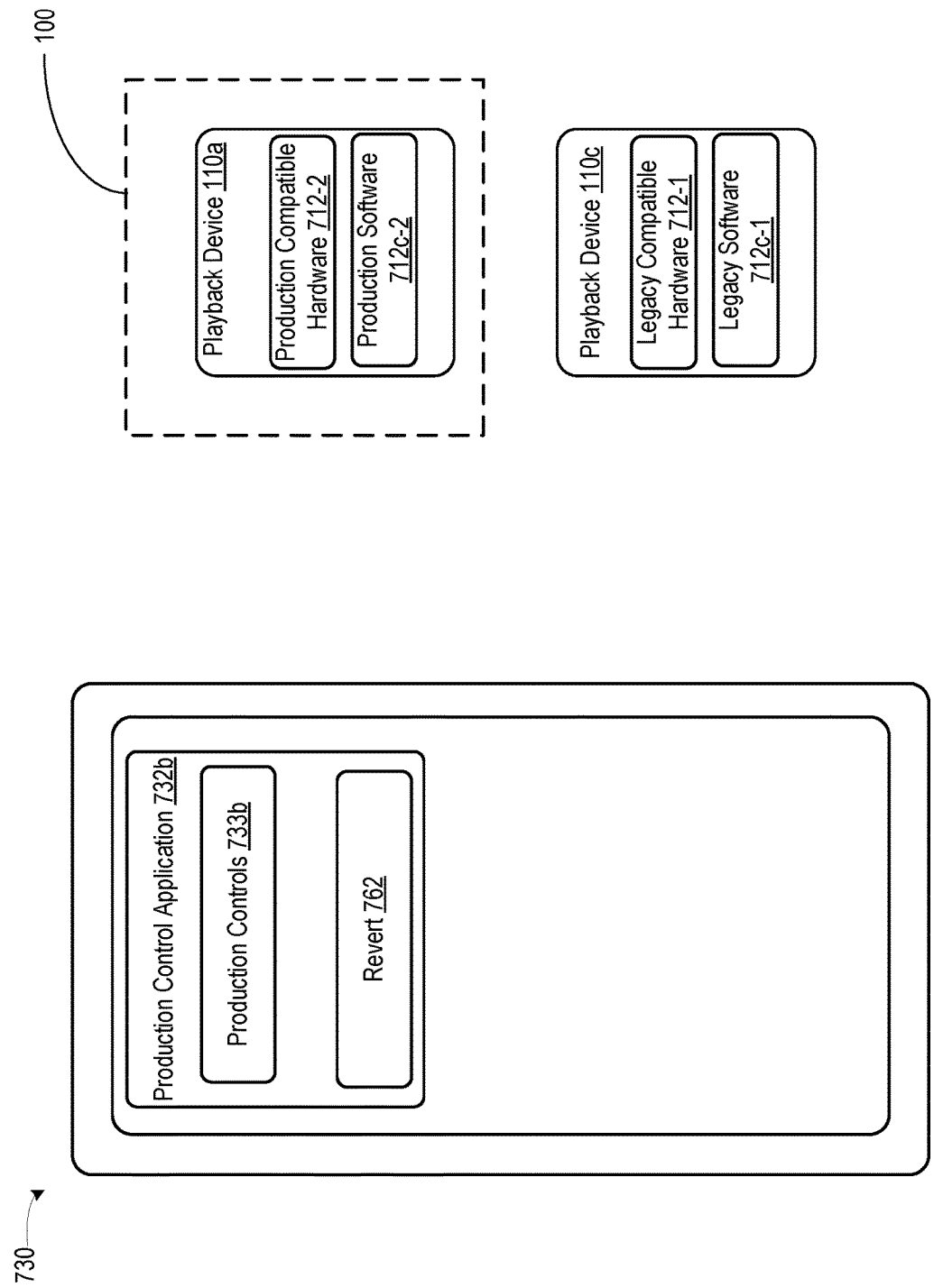

FIGS. 7A-7C are block diagrams illustrating example media playback system migration, according to example embodiments. FIG. 7A shows a legacy control application 732a and a production control application 732b on control device 730. The legacy control application 732a and production control application 732b may for example be two distinct smartphone applications. Alternatively, the legacy control application 732a and production control application 732b may be implemented as distinct features within a single smartphone application, such as user interface 431 (FIGS. 4A and 4B). In another example embodiment, the legacy control application 732a and the production control application 732b may be applications compiled to execute on a personal computer, such as user interface 531 (FIG. 5), or as a webpage (e.g., a browser based application). In yet another example, the legacy control application 732a and the production control application 732b may represent both smart phone applications and web based players. In some examples, the legacy control application 732a and the production control application 732b are available via the computing device(s) 106 (FIG. 1B). In some embodiments, a user may be able to switch back and forth between the legacy control application 732a and the production control application 732b on the control device 730.

The production control application 732b may include production controls 733b corresponding to production playback features, which are supported by playback devices which include production compatible hardware 712-2. In some embodiments, production compatible hardware 712-2 may also be compatible with the legacy control application 732a and legacy features. For example, the production control application 732b may include features requiring the greater hardware capabilities of newer generation playback devices, as well as core features and controls performable on playback devices with limited hardware and software capabilities. Further, the production control application 732b may operate according to software interfaces (e.g., application programming interfaces) and other conventions that are not able to be interpreted by the legacy software 712c-1, but are able to be interpreted by the production software 712c-2.

The legacy control application 732a may include legacy controls 733a corresponding to legacy playback functions, which are supported by playback devices which include legacy compatible hardware 712-1. Legacy compatible hardware 712-1 is incompatible with production control application 732b. Features of the legacy control application 732a may be a subset of features of the production control application 732b. For example, the legacy control application 732a may include some, but not all, of the features of the production control application 732b. In some cases, the legacy control application 732a may operate according to software interfaces (e.g., application programming interfaces) and other conventions that are not able to be interpreted by the production software 712c-2, but are able to be interpreted by the legacy software 712c-1.

FIG. 7A further shows playback devices 110a and 110c of media playback system 100 (FIG. 1A). In this example, playback device 110a is a newer generation playback device that includes production compatible hardware 712-2 (i.e., a production playback device) and playback device 110c is a prior generation playback device that includes legacy compatible hardware 712-1 (i.e., a legacy playback device).

In some examples, the production compatible hardware 712-2 may include, for example, processors 112a-2 with greater processing power and/or memory 112b-2 with more available storage than the legacy compatible hardware 718 having processors 112a-1 with and memory 112b-1 (FIG. 1C). Further, the production compatible hardware 712b may include additional components relative to the legacy compatible hardware 712a. Other differences may exist as well.

As such, the playback device 110a, with production compatible hardware 712-2, may be able to perform additional and/or different functions relative to the playback device 110c, which includes legacy compatible hardware 712-1. Conversely, playback device 110c may be able to perform a subset of functions relative to playback device 110a. In some examples, playback device 110c may be able to perform deprecated functions that are no longer implemented in the production playback device 110a.

For example, in some embodiments, the set of legacy playback functions may include playing back media items from data storage on a LAN, from a line-in, and one or more streaming audio services (e.g., Spotify, Radio by Tunein, Apple Music, Pandora, Amazon) and exclude playing back media items from servers of at least one other streaming audio service. Conversely, in these embodiments the set of production playback functions may include playing back media items from the servers of the at least one other streaming audio service.

In another example, the set of legacy playback functions may include forming synchrony groups among playback devices that are hardware-compatible with the legacy software 712c-1 and exclude forming synchrony groups among playback devices that are hardware-incompatible with the legacy software 712c-1. In these examples, the set of production playback functions may include forming synchrony groups among playback devices that are hardware-compatible with the production software 712c-2.

In yet another example, the set of legacy playback functions may include adding playback devices to the legacy media playback system 100b that are hardware-compatible with the legacy software 712c-1 and exclude adding playback devices to the legacy media playback system 100b that are hardware-incompatible with the legacy software 712c-1. In these examples, the set of production playback functions may include adding playback devices to the production media playback system 100a that are hardware-compatible with the production software 712c-2.

In a further example, the set of production playback functions includes forming synchrony groups with playback devices from other manufactures (e.g., playback devices that operate in a different timing domain) but are nonetheless able to be synchronized with the playback devices 110 of the media playback system 100 via a protocol or standard (e.g., AirPlay 2). Legacy playback functions may exclude this feature as the legacy compatible hardware 712-1 does not include the necessary hardware.

In yet another example, the set of production playback functions include voice control via a voice assistant service. The production compatible hardware 712-2 may include hardware components to implement the NMD 120, while the legacy compatible hardware 712-1 might exclude this hardware. Other examples are possible as well.

Before system migration, playback devices 110a and 110c include legacy software 712a and legacy software 712c-1', which is compatible with the legacy control application 732a. The legacy control application 732a includes legacy controls 733a, operable to control playback devices 110a and 110c based on these playback devices including the legacy software 712a. Further, the legacy controls 733a may be operable to control the playback devices 110a and 110c in performing playback and associated functions, such as the functions described herein.

The legacy control application 732a may additionally include a migration function 760. In some embodiments, the legacy control application 732a may identify playback devices within the media playback system 100 that include production compatible hardware 712-2. Identifying the playback devices may involve querying the playback devices 110 of the media playback system 100 for hardware information (e.g., a serial or model number) or querying a database maintained on the control device 730 or another device in the media playback system 100 for the hardware information of the playback devices 110.

Once identified, the legacy control application 732a may present a user with the option to migrate playback devices with production compatible hardware 712-2 to production software 712c-2. For example, the legacy control application 732b may display a prompt such as, "Would you like to migrate your SONOS ONE (i.e., playback device 110a) to production control software?" as part of migration function 760. In some examples, a user may be prompted with this option during use of the legacy control application 732b. In other examples, legacy control application 732a may send this message by way of e-mail or text message to an e-mail address or phone number associated with a user's pre-existing account.

In examples where, by way of the migration function 760, the option to migrate compatible playback devices is selected, the legacy control application 732a causes the playback devices 110 having production compatible hardware 712-2 to install the production software 712c-2. For instance, the legacy control application 732a may send instructions to migrate compatible playback devices 110 (e.g., the production playback device 110a) to the production software 712c-2. In some embodiments, these instructions include a command to replace the legacy software 712c-1 with the production software 712c-2. For example, the playback device 110a may remove legacy software 712c-1 and download and install production software 712c-2. In some embodiments, the playback device 110a may download production software 712b, for example, by way of the cloud network 102 from the computing device(s) 106. Further, in some embodiments, the legacy control application 732a may remove the production playback device 110a and/or the legacy playback device 110c from the media playback system 100.

In some embodiments, migrating playback devices with production compatible hardware 716 may be performed through the legacy control application 732a. In these examples, once the production playback device(s) migrate to production software 712c-2, the production playback device(s) 110 may only be operable via the production control application 732b.

Alternatively, the production control application 732b may include the migration function 760. A user may install the production control application 732b on the control device 730, perhaps after receiving a message suggesting migration to production software in the legacy control application, or via another medium, such as e-mail or text message. After launching, the production control application 732b may identify playback devices 110 within the media playback system 100 that include production compatible hardware 712a. Further, the production control application 732b may display a prompt to migrate the identified playback devices 110 that include production compatible hardware 712a to the production software 712b. In these examples, the legacy playback devices 110 may be operable on production control application 706 to initiate the migration function 760.

FIG. 7B illustrates a block diagram of the media playback system 100 after playback device 110a has migrated to production software 712c-2. As shown, the playback device 110a has been migrated to the production software 712-2. The playback device 110c has been removed from the media playback system 100. Once the production playback device(s) 110 have migrated to production software 712c-2, the legacy playback device(s) 110 may only be operable via the legacy control application 732a (i.e., as part of a new media playback system 100b) or not at all (i.e., if removed from the media playback system 100). Further, the legacy control application 731a is no longer installed on the control device 730.

In some examples, the migration function 760 may include a cloud-assisted trade-up of the playback device 110c. Using the production control application 732b (and/or the legacy control application 732b), the user may indicate an intention to trade-up the legacy playback device 110c for a playback device 110 that includes production compatible hardware 712-2. In some cases, the production control application 732b displays a prompt to trade-up to an equivalent playback device 110, such as a current generation of the playback device 110c. In other examples, the production control application 732b may also display a prompt to trade-up to alternative playback devices 110, such as larger and/or more powerful playback devices 110.

In some example embodiments, the legacy control application 732a and/or the production control application 732b may form two separate media playback systems. FIG. 7C illustrates a block diagram of production media playback system 100a including the playback device 110a, as well as legacy media playback system 100b including the playback device 110c. In examples where an environment, such as a household, has both legacy playback devices and/or production playback devices, the legacy control application 732a controls the legacy playback devices (having legacy compatible hardware 712-1) and the production control applications 732b control the production playback devices (having production compatible hardware 712-1).

The media playback system 100a further includes a playback device 110o. The playback device 110o represents a new playback device that has been added to the production media playback system 100a to replace the playback device 110c, perhaps using the cloud-assisted trade-up technique described above. As shown, in contrast to the playback device 110c, the playback device 110o includes production compatible hardware 712-2' and production software 712c-2' to achieve compatibility with the production compatible hardware 712-2 and production software 712c-2 on the playback device 110a, as well as on other production playback devices 110 in the media playback system 110a.

The control device 730 includes the legacy control application 732a as well as the production control application 732b. Referring to legacy control application 732a, the legacy controls 733a may include controls to operate the legacy playback device(s) individually or together with the devices in legacy media playback system 100b. Further, legacy media playback system 100b may further be divided into zones, such as "Kitchen" and/or "Den". The "Kitchen" zone, for example, may include the legacy playback devices in the kitchen of a household.

Similarly, referring to production control application 732b, the production controls 733b may include controls to operate the production playback device(s) individually or together with the devices in production media playback system 100a. Further, the production media playback system 100a may further be divided into zones, such as "Living Room" and/or "Den". The "Kitchen" zone, for example, may include the production playback devices in the kitchen of a household. Since these are different media playback systems, each system may re-use the zone name, but generally, a user is not likely to use production and legacy playback devices in different systems within the same room.

In some embodiments, the production control application 732b may include a revert function 762. The production control application 732b may display a prompt to migrate the playback device(s) 110 of the media playback system 100a back to legacy software 732c-1. For example, the production control application 732b may display a message such as, "Would you like to revert SONOS ONE (e.g., production playback device 110a) to legacy software?" as part of revert function 762. In some examples, a user may be prompted with an option during use of the production control application 762. In other examples, production control application 732b may send this message by way of e-mail or text message to an e-mail address or phone number associated with a user's pre-existing account.

In examples where, by way of the revert function 762, the option to revert eligible devices is selected, the production control application 732b may send instructions to revert eligible devices (i.e., playback device 110a) to the legacy software 712c-1. In some embodiments, these instructions include a command to replace the production software 712c-2 with the legacy software 712c-1. For example, the playback device 110a may remove production software 712c-2 and download and install legacy software 712c-1. In some embodiments, playback device 110a may access legacy software 712c-1, for example, by way of the cloud network 102. Further, in some embodiments, the production control application 732b may remove playback device 110a from production media playback system 100a and add playback device 110a to legacy media playback system 100b. Additionally or alternatively, in some embodiments, the legacy control application 732a may include a revert function 762.

In some embodiments, the user may desire reverting some or all of the playback devices 110a, 110c in production media playback system 100a to legacy software 712c-1, the production control application 706, by way of the revert function 762. In these examples, the control device 730 may receive input data indicating a command to revert eligible devices by way of the revert function 762. In some examples, the production control application 732b may send instructions to revert all playback devices (e.g. the playback devices 110a and 110o) to the legacy software 712c-1. In some embodiments, these instructions include a command to replace the production software 724 with the legacy software 720. In these examples, the production control application 706 may remove the playback devices 110a and 110o from production media playback system 100a and add playback device 110a to legacy media playback system 100b.

In alternative embodiments, the user may select a subset of the production playback system 100a to revert to legacy software 712c-1. For example, the user may choose to revert playback device 110a to legacy software 712c-1 and continue operation of playback device 110o with production software 712c-2'. The production control application 732b may then send instructions to playback device 110a to replace the production software 712c-2 with the legacy software 712c-1. In these examples, the production control application 732b may remove the playback device 110a from the production media playback system 100a and add the playback device 110a to the legacy media playback system 100b. The playback device 110o may remain in production media playback system 100a.

Figure 7D:
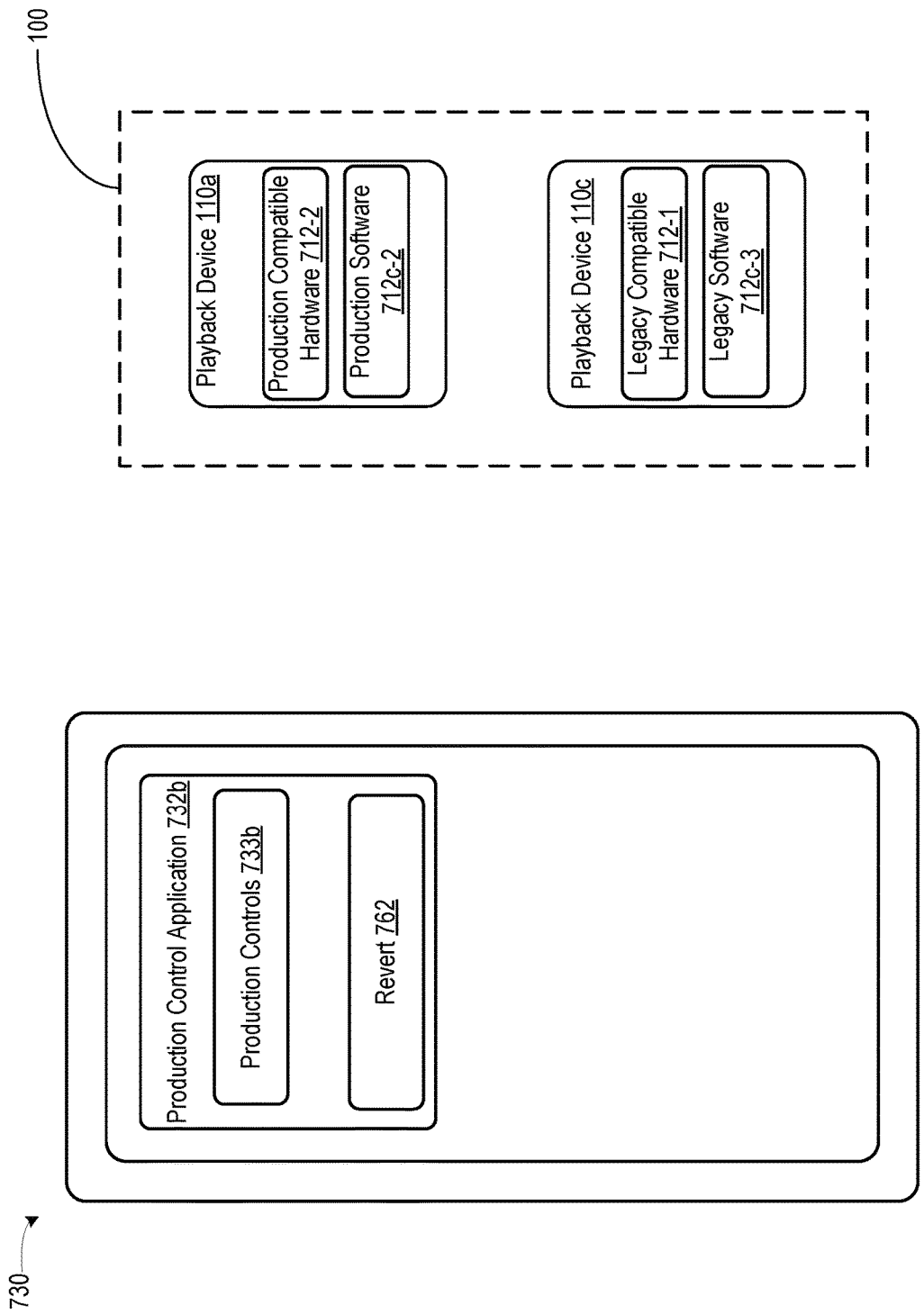

In further examples, when migrating the media playback system 100 to the production software 712c-2, the legacy playback devices may install legacy software 712c-3 on the playback devices 110 with legacy compatible hardware 712-1. FIG. 7D is a block diagram illustrating the playback 110c having legacy software 712c-3 installed. In contrast to the legacy software 712c-1, the legacy software 712c-3 is configured to operate with the production control application 732b and playback devices 110 having the production compatible hardware 712-2 and the production software 712c-2.

In this example, the limitations of the legacy compatible hardware 712-1 are programmed into the legacy software 712c-3, the production control application 732b, and/or the production software 712c-2. To maintain compatibility with the playback devices 110 having the production compatible hardware 712-2 and the production software 712c-2, certain functionality is offloaded to the playback devices 110 having the production compatible hardware 712-2 and the production software 712c-2. For instance, if a synchrony group is created that includes both the playback device 110a and the playback device 110c, the synchrony group may automatically designate the playback device 110a as group coordinator and/or may prevent the playback device 110c from attempting to operate as group coordinator (instead forcing the playback device 110c to operate as a group member). As another example, if the playback device 110c attempts to play an audio source that is unsupported by the legacy software 712c-3, the playback device 110a may stream the audio content from the audio source, convert the audio content to a format supported by the legacy software 712c-3, and send the converted audio content to the playback device 110c. In a third example, if the playback device 110a includes an NMD 120a and the playback device 110c does not include voice hardware, the NMD 120a may receive a voice command directed at the playback device 110c, process the voice command, convert the command into a playback command that the legacy software 712c-1 can interpret, and send the playback command to the playback device 110c to be carried out.

b. System Migration and Reversion User Interfaces

Figures 8C, 8D:
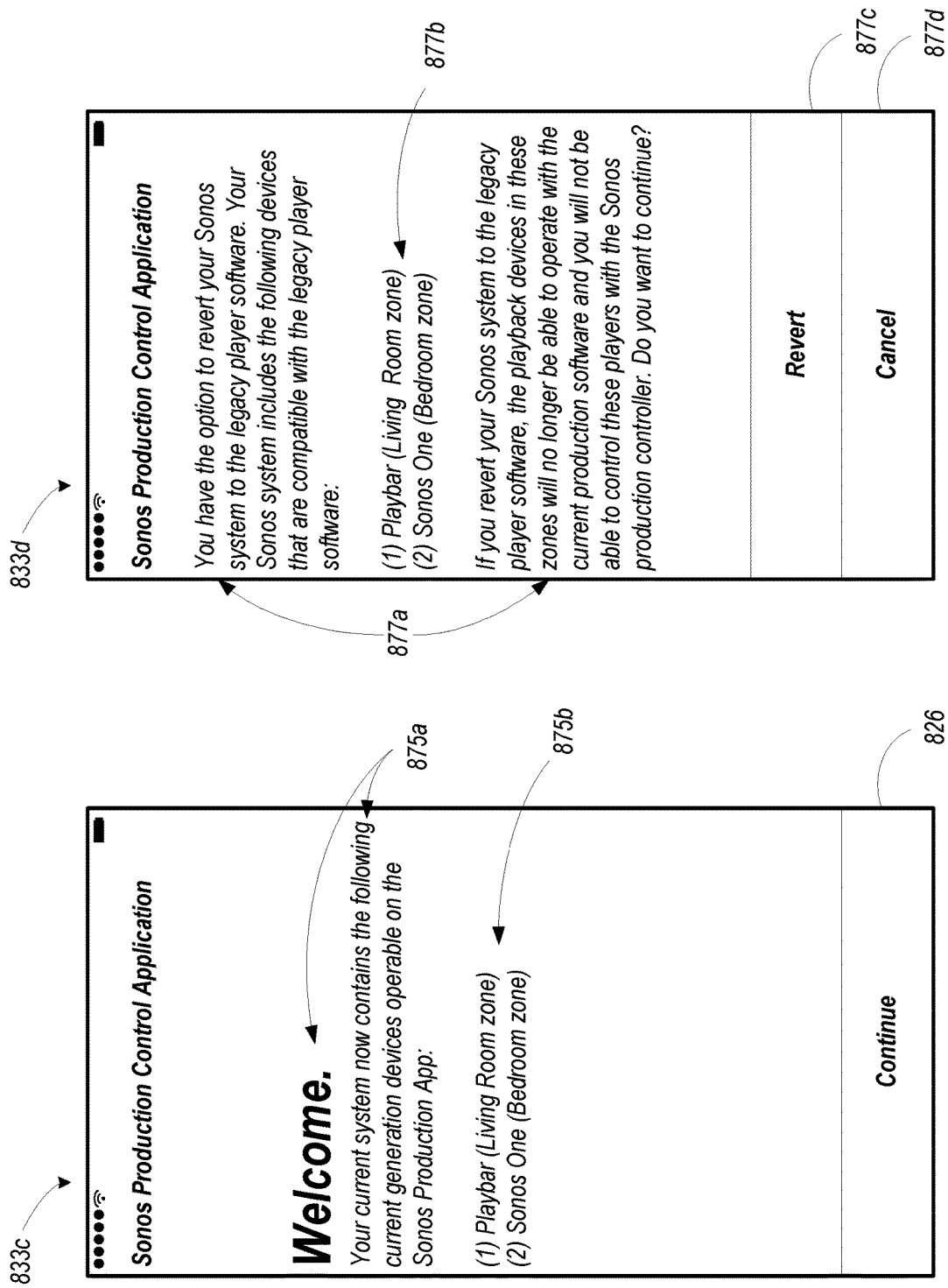

FIGS. 8A-8F are example user interfaces in accordance with aspects of this disclosure. FIG. 8A shows an illustrative user interface 833a to facilitate the migration function 760 (FIG. 7A), which may be displayed as part of the legacy control application 732a or production control application 732b. As shown, the user interface 833a includes a graphical representation 871a that includes a prompt indicating that the certain playback devices within a playback media system are eligible for migration from legacy software 712c-1 to production software 712c-2. Graphical representation 871a further includes an explanation of migration function 760. Yet further, the user interface 833a includes a selectable control 871b, that when selected, initiates migration of eligible playback devices 110 to production software 712c-2. Alternatively, a selectable control 871c cancels migration and the media playback system 100 continues to use legacy software.

User interface 833a further includes a graphical representation 871d indicating which playback devices are eligible for the migration (i.e., "Playbar" and "SONOS ONE"). In some embodiments, the graphical representation 871d may further include selectable control corresponding to respective eligible playback devices 110. The selectable controls may be selected to indicate a particular playback device 110, for example "Playbar", to be migrated to the production software system. For example, if "Playbar" is selected and "SONOS ONE" is not selected, only "Playbar" has been chosen for migration. Alternatively, in some embodiments, the legacy control application 732a may only allow all of the eligible devices in the media playback system 100 to be migrated to production software 712c-2.

FIG. 8B shows an illustrative user interface 833b that may be displayed following a successful migration using the migration function 760. As shown, the user interface 833b includes a graphical representation 873a that may include a message that migration of the selected eligible playback devices 110 has completed. User interface 833b also includes a graphical representation 873b indicating the playback devices 110 that have successfully completed migration to the production software 712c-2 and are operable on the Sonos Production Application (i.e., "Playbar" and "SONOS ONE"). Further, user interface 833b also includes a graphical representation 873c indicating the playback devices 110 that remain on the legacy media playback system 110b (FIG. 7C) and continue to be operable on the legacy control application 732a (i.e., "Play 5", "Connect Amp", and "Bridge"). Alternatively, if a migration is not successful, a user interface may display an error message which playback device or playback devices did not successfully download and install the production software 732c-2.

FIG. 8C shows an illustrative user interface 833c that may be displayed by the production control application 732b following a successful migration. As shown, the user interface 833c includes a graphical representation 875a indicating that playback devices are operable and/or compatible with the production control application 732b. The user interface 833c may further include a graphical representation 875b indicating the playback devices 110 that have been successfully migrated and which are now operable with the production control application 732b.

FIG. 8D shows an illustrative user interface 833d to facilitate the revert function 762 (FIG. 7A). As shown, the user interface 833d includes a graphical representation 877a indicating that the playback devices 110 within the playback media system 100 may be reverted from production software 712c-2 to legacy software 712c-1.

User interface 833d further includes a graphical representation 877b indicating which playback devices are eligible for reversion (i.e., "Playbar" and "SONOS ONE"). In some embodiments, graphical representation 877b may further include selectable icons corresponding to playback devices. The selectable icon may be selected to indicate a particular playback device 110, for example "Playbar", to be reverted to the legacy software system. For example, if "Playbar" is selected and "SONOS ONE" is not selected, only "Playbar" has been chosen for reversion. Alternatively, in some embodiments, the production control application 732b may only allow the media playback system 100 to be reverted to legacy software as a whole.

User interface 833d further includes selectable icons 877c and 877d. Selectable icon 877c may be selected to revert selected playback devices 110 from production control software 712c-2 to legacy control software 712c-1. Selectable icon 877d may be selected to cancel the reversion process.

FIG. 8E shows an illustrative user interface 833e to facilitate a trade-up feature. User interface 833e includes a graphical representation 879a indicating that an option is available to replace one or more playback devices 110 with legacy hardware 712-1 with one or more playback devices with production hardware 712-2. Further, these replacement playback devices with production hardware 712-2 will be pre-configured to replace the playback device(s) 110 with legacy hardware 712-1. The user interface 833e includes a graphical representation 879b indicating the two playback devices 110s that will be replaced.

Further, in this example, the user interface 833e includes a graphical representation 879c indicating that a certain device (i.e., "Bridge") will not be replaced. In some examples, the functionality of certain hardware, like a bridge to extend network 104, might not be necessary for the media playback system 100 on production hardware 712-2, perhaps due to increases in wireless range of the wireless interfaces 112e. Accordingly, this example illustrates that one device will not be replaced because it is deprecated.

User interface 833e further includes selectable icons 879d, 879e and 879f. Selectable icon 879d may be selected to initiate a trade-up function (e.g., a cloud-based trade-up function). Selectable icon 879e is selectable to initiate the trade-up function including transfer of settings from the legacy playback device(s) 110 to the replacement production playback devices 110. Selectable icon 879f is selectable to cancel the trade-up function.

FIG. 8F shows an illustrative user interface 833f that may be displayed after the user confirms the trade-up. As shown, the user interface 883f includes a graphical representation 881a indicating that the trade-up process is finished (until the replacement playback devices 110 arrive and are to be set-up). The user interface 833f also includes a graphical representation 881b explaining the replacement playback devices 110 that will be sent as part of the trade-up process.

To encourage the trade-up, the user may receive a credit for recycling their legacy playback device(s) 110. The user interface 833f of FIG. 8F includes a graphical representation 881c indicating that a shipping label has been sent to the user's registered email address. Using the shipping label, the legacy playback device(s) 110 may be returned to a recycling center.

FIG. 9A shows an illustrative user interface 933a of the legacy control application 732a. As shown, the user interface 933a includes a set of legacy functions, such as a graphical representation 983a media content information of playing back on a legacy playback device 110 (e.g., track name, artist, album) and a legacy transport controls 983b (e.g., play, previous, next, pause, volume).

Additionally, the set of legacy playback functions may include adding playback devices 110 to the media playback system 100 that are hardware-compatible with the legacy software 712c-1 and exclude adding playback devices to the media playback system 100 that are hardware-incompatible with the legacy software 712c-1. In these examples, user interface 933a may include a graphical representation 983c of an option to add another legacy playback device 110 to the media playback system 100.

In some embodiments, the set of legacy playback functions may include forming synchrony groups among playback devices that are hardware-compatible with the legacy software 712c-1 and exclude forming synchrony groups among playback devices that are hardware-incompatible with the legacy software 712c-1. In these examples, user interface 933a may include a graphical representation of an option to create a synchrony group with other legacy playback devices.

Further, in some embodiments, the set of legacy playback functions may include playing back media items from data storage on a LAN and a line-in and exclude playing back media items from servers of at least one streaming audio service (e.g., Spotify, Radio by Tunein, Apple Music, Pandora, Amazon, TV, local music, line-in) by way of legacy transport controls 983b.

FIG. 9B shows an illustrative user interface 933b of the production control application 732b. As shown, the user interface 933b includes a set of production functions, such as a graphical representation 985a indicating media content information of audio content playing back on a production playback device 110 (e.g., track name, artist, album) and production transport controls 985b (e.g., play, previous, next, pause, volume).

The set of production playback functions may additionally include playing back media items from the servers of the at least one streaming audio service (e.g., Spotify, Radio by Tunein, Apple Music, Pandora, Amazon, TV, local music, line-in). In these embodiments, graphical interface 933b may additionally include a graphical representation 985c of the media content source (e.g., "Streaming: Spotify Daily Mix 1"). The graphical representation 985c may additionally implement a selectable icon to change the source of the media content. For example, selecting a media content selectable icon may navigate to another user interface including media content source options, which facilitates switching the audio source from listening a streaming audio service audio stream to TV audio. In another example, the selectable icon of the graphical representation 985c may prompt a drop down menu of selectable icons corresponding to various media content sources.

Further, the set of production playback functions may include forming a synchrony group with other playback devices that are hardware-compatible with the production player software 712c-2. In these examples, the user interface 933b may include a selectable icon 985d that when selected, provides an option to add another production playback device 110 to a synchrony group with the currently controlled playback device 110 (i.e., the kitchen 101h).

Additionally, the set of production playback functions may include adding additional playback devices 110 that include production compatible hardware 712-2 to the media playback system 100. In these examples, the user interface 933b may include a selectable control 985e to add playback devices to the media playback system 100 that are hardware-compatible with the production software 712c-2.

V. Example Techniques to Manage Media Devices Having Limited Capabilities

Figure 10:
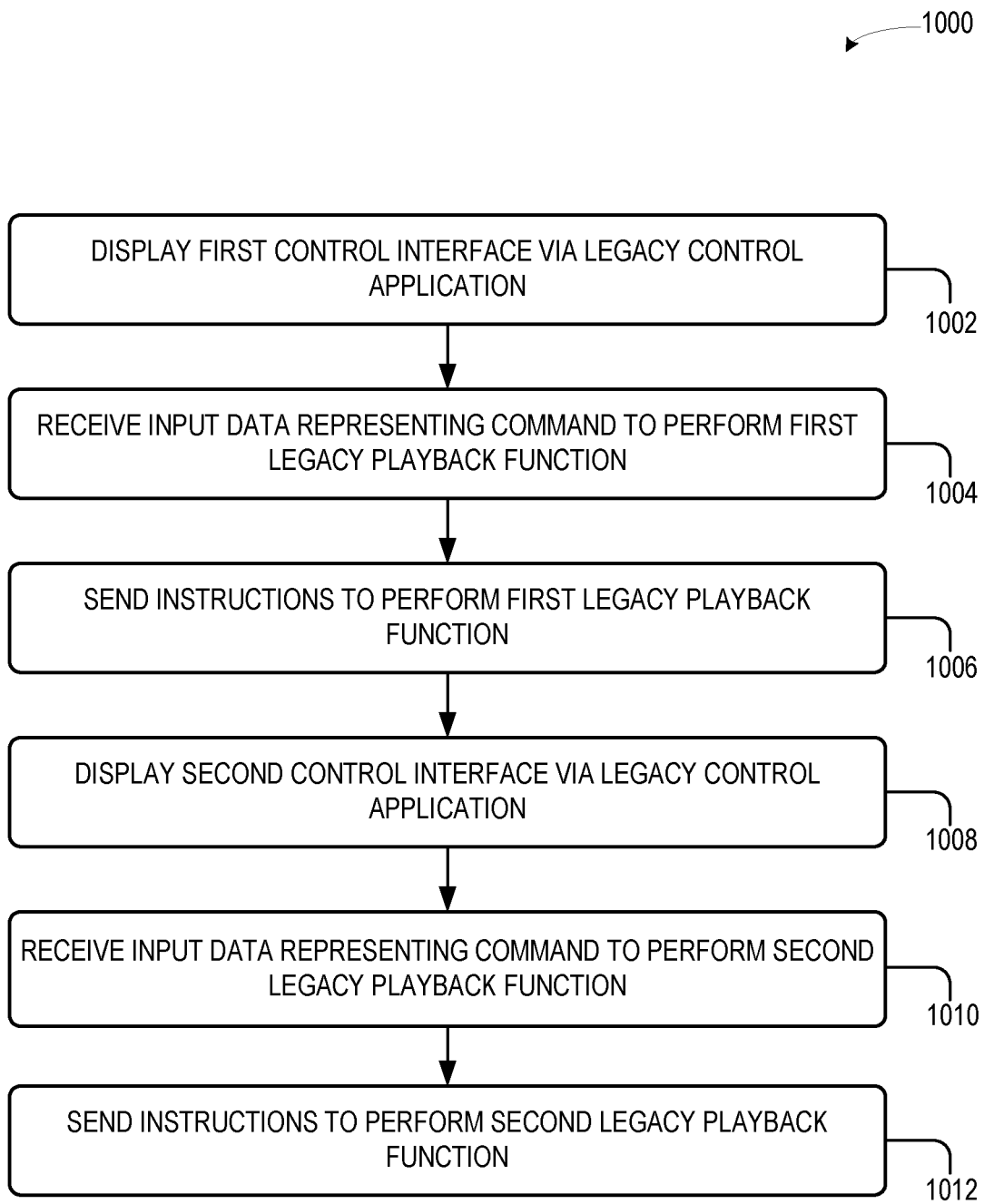
FIG. 10 shows an example technique to manage playback devices with limited capabilities in accordance with aspects of this disclosure.

FIG. 10 is a flow diagram showing an example method 1000 of managing media devices with limited capabilities.

At block 1002, the method 1000 includes displaying a first control interface via a legacy control application. For instance a control device (e.g., the control device 730) may display, via a legacy control application (e.g., the legacy control application 732a) installed on the control device, a first control interface (e.g., user interface 933a) that includes first playback controls operable to control a first playback device (e.g., the playback device 110a) in performing a set of legacy playback functions. The first playback device may include legacy player software 712c-1 compatible with the set of legacy playback functions supported by the legacy control application 732. The first playback device is hardware-compatible with production player software (e.g., production software 712c-2) compatible with a set of production playback functions supported by a production control application (e.g., the production control application 732b). Further, the legacy playback functions may include a subset of the production playback functions.

At block 1004, the method 1000 includes receiving input data representing a command to perform a first legacy playback function. For instance, the control device 730 may receive a playback command via the legacy control application 732a.

At block 1006, the method 1000 includes sending instructions to perform a first legacy playback function. For example, the control device 730 may send, via a network interface to the playback device 110a, instructions to perform the first legacy playback function.

At block 1008, the method 1000 includes displaying a second control interface via the legacy control application. For instance, the control device 730 may display, via the legacy control application 732a, a second control interface includes second playback controls operable to control a second playback device (e.g., the playback device 110c) in performing the set of legacy playback functions. The second playback device includes the legacy player software 712c-1 compatible with the set of legacy playback functions supported by the legacy control application 732a. Further, the second playback device is hardware-compatible with the legacy player software 712c-1 and hardware-incompatible with the production player software 712c-2.

At block 1010, the method 1000 includes receiving input data representing a command to perform a second legacy playback function. For instance, the control device 730 may receive a playback command via the legacy control application 732a.

At block 1012, the method 1000 includes sending instructions to perform a first legacy playback function. For example, the control device 730 may send, via a network interface to the playback device 110c, instructions to perform the first legacy playback function.

Figure 11:
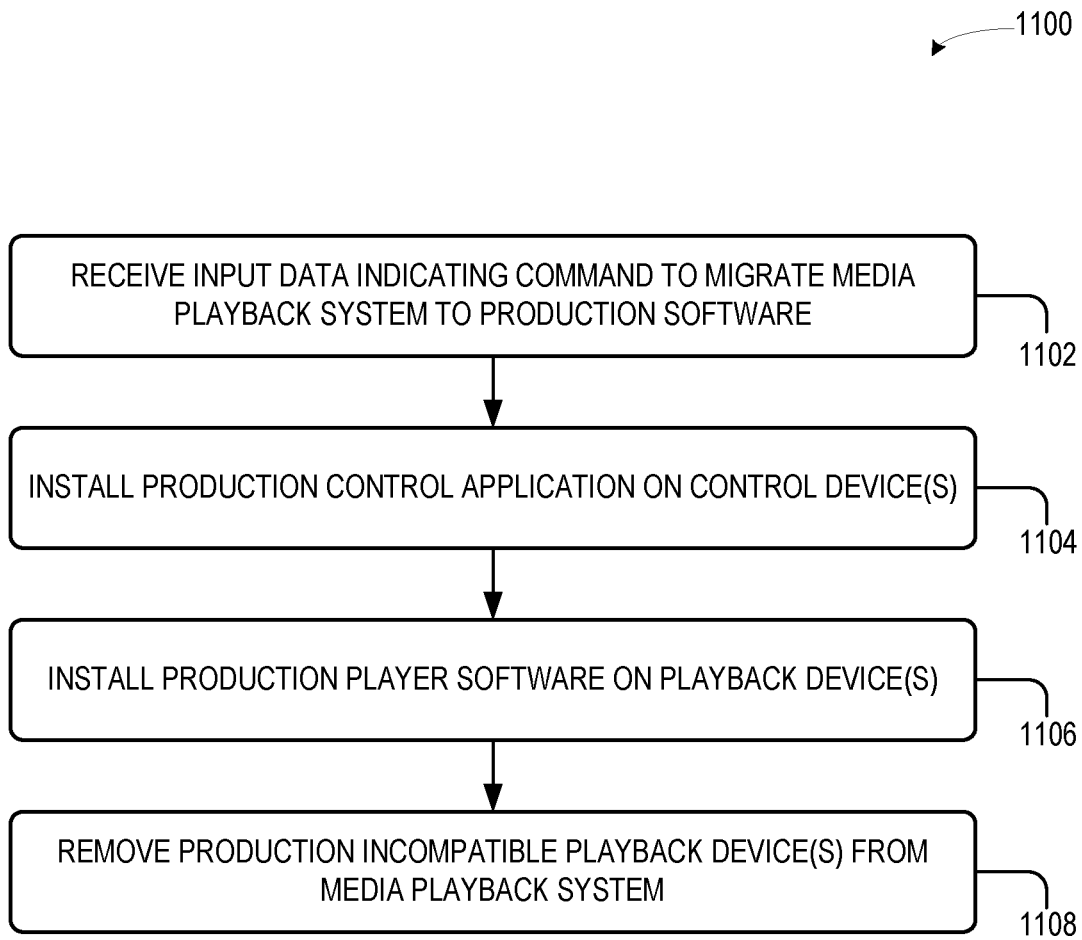
FIG. 11 shows an example technique to migrate a media playback system to production software.

FIG. 11 is a flow diagram showing an example method 1100 of migrating a legacy media playback system to production software.

At block 1102, the method 1100 involves receiving input data indicating a command to migrate a media playback system to production software. For instance, using FIG. 8A as an example, receiving such input data may involve receiving input data representing selection of the selectable control 871b on control interface 833a. As described above, selection of such a control may initiate migration of the media playback system 100 from legacy software 712c-1 to production software 712c-2 (FIG. 7A). In some examples, this command initiates the migration function 760.

At block 1104, the method 1100 involves installing the production control application on the control devices. For example, referring to FIG. 7A, the control device 730 may install the production control application 732b in memory (e.g., memory 132b of FIG. 1H). In some examples, the production control application 732b replaces the legacy control application 732a in memory. Alternatively, the legacy control application 732a and the production control application 732b are installed in memory concurrently.

At block 1106, the method 1100 involves installing the production player software on the playback devices. For instance, as described above in connection with FIGS. 7A and 7B, the playback devices 110 having production compatible hardware 712-2 may install the production software 712c-2 in memory (e.g., memory 112b of FIG. 1C). In some implementations, the production software 712c-2 replaces the legacy software 712c-1 in memory.

At block 1108, the method 1100 involves removing incompatible playback devices from the media playback system. For instance, referring to FIG. 7B, the media playback system 100 may remove the playback device 110c from the media playback system 100. Recall that the playback device 110c is incompatible because it excludes the production compatible hardware 712-2 (instead including the legacy compatible hardware 712c-1). In some cases, the control device 730 may facilitate creating a new legacy media playback system that includes the playback devices 110 having the legacy compatible hardware 712c-1 (e.g., the media playback system 100b of FIG. 7C). Alternatively, the playback devices 110 having the legacy compatible hardware 712c-1 are recycled, perhaps as part of a trade-up procedure. The control device 730 may display the control interface 833b (FIG. 8B) or similar following the migration.

Figure 12:
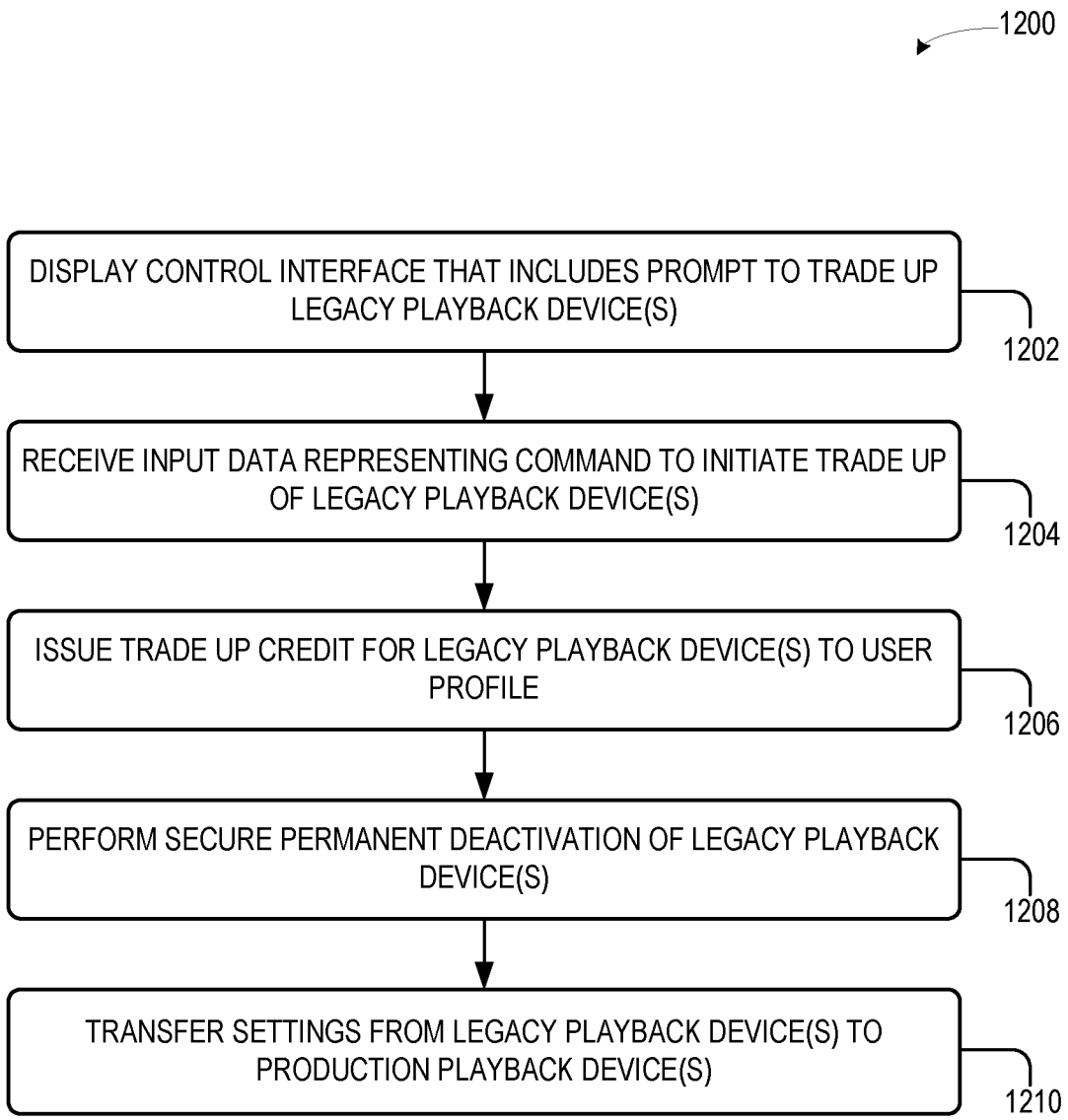
FIG. 12 shows an example technique to facilitate end-of-life for legacy playback devices.

FIG. 12 is a flow diagram showing an example method 1200 of trading up a legacy playback device to a production playback device.

At block 1202, the method 1200 involves displaying a control interface that includes a prompt to trade-up legacy playback devices. For instance, referring to FIG. 8E, the control device 730 may display the control interface 833e, which includes graphical representation 879a indicating that an option is available to replace one or more playback devices 110 with legacy hardware 712-1 with one or more playback devices with production hardware 712-2. Such a prompt may also be displayed in a browser on a webpage.

At block 1204, the method 1200 involves receiving input data representing a command to initiate trade-up of legacy playback devices. For example, referring again to FIG. 8E, the control device 730 may receive input data representing a selection of selectable control 879*d*, which represents a command to initiate trade-up of the playback devices 110 in the media playback system 100 which include the legacy compatible hardware 712-1.

At block 1206, the method 1200 involves issuing a trade-up credit for the legacy playback devices to a user profile. For instance, the computing devices 106 of the cloud network 102 may credit a user profile (also referred to as a user account) registered with the media playback system 100 with one or more trade-up credits corresponding to the legacy playback devices being traded-up. The amount of the trade-in credit may be stored in memory of the computing devices 106 using a table, database, or the like. Trade-up values may change over time. The control device 730 may display an indication of the trade-up credit, perhaps separated out into the respective trade-up credit for each legacy playback device.

More particularly, after the user initiates the trade-up, the computing devices 106 of the cloud network 102 may initiate an order for the new playback devices 110, perhaps via a website or within the production control application 732*b*, which facilitates the new playback device(s) 110 being delivered to the user. Alternatively, the user may initiate an order via a web site or use the credit in-store. Other examples are possible as well.

At block 1208, the method 1200 involves performing a secure permanent deactivation of the legacy playback device(s). For instance, the legacy playback devices 110 are put into a permanent deactivation mode in which the legacy playback devices 110 are permanently deactivated in the legacy software 712*c*-1. Deactivated playback devices 110 no longer transmit availability data and so no longer show up as playable zones in the media playback system 100. If an attempt is made to add a deactivated playback device 110 to another media playback system, the control application displays a prompt indicating that the playback device 110 is deactivated and cannot be added to a media playback system.

Within examples, the permanent deactivation persists through factory reset as well as other types of resets. In one example, the permanent deactivation is set via a hardware flag set in persistent memory. Permanent deactivation allows the user to participate in the trade-up function (and receive the associated credit) without necessarily returning the legacy playback devices 110 and/or without waiting while the legacy playback devices 110 are processed by a recycling center or the like. Instead, a credit is applied to the user's account for the trade-up in connection with the permanent deactivation of the legacy playback devices 110.

As part of deactivation, the computing devices 106 may also generate a shipping label and deliver the shipping label to the user via email (e.g., via an attached document) or text message (e.g., via a web link to the label) to facilitate the user sending the legacy playback devices 110 to a recycling center for recycling. Alternatively, the control device 730 may display a graphical representation of recycling centers in the user's geographical area (e.g., within a threshold distance from the user's saved address). Other examples are possible as well.

Since the deactivation is permanent, the media playback system 100 may implement a secure deactivation technique in an effort to prevent unwanted deactivation, such as accidental deactivation and/or deactivation by bad actors, among other examples. Example secure deactivation techniques involve initiating deactivation on a web page in a web browser and then confirming the deactivation via a control application on a control device 130. The secure deactivation techniques may require that the control device 130 be connected to the same local area network (e.g., the network 104) as the legacy playback device(s) 110 that are being deactivated.

In an example, when the deactivation is confirmed, the computing devices 106 of the cloud network 102 send a deactivation command to the media playback system 100. The deactivation command may include a first parameter indicating an identifier of a first playback device 110 that is not being deactivated, but that will receive the deactivation command. A second parameter of the deactivation command includes an identifier of a second playback device 110 that is being deactivated. In an effort to prevent false positive deactivations, the deactivation function may require that the first and second playback devices be registered to the same account and be part of the same media playback system 100. A secure connection, such as HTTPS, may also be required. In an example, a third parameter may specific a period of time to delay the deactivation, which may facilitate the user receiving the replacement playback devices 110 before the legacy playback devices 110 are deactivated.

At block 1208, the method 1200 involves transferring settings from the legacy playback device(s) to the production playback device(s). For instance, to facilitate the trade-up, the settings associated with the legacy playback device 110*c* are saved (e.g., in data storage of the production playback devices 110 of media playback system 100 or in data storage of the computing devices 106 of the cloud network 102). These settings may include assigned zone, equalizations, calibrations, and/or other playback device audio settings. Then, the new playback device 110 can be pre-configured with these settings (e.g., at the factory or distribution center) or configured automatically when the new playback device 110 is added to the media playback system 100, perhaps by transmitting one or more instructions to adopt the saved settings over the network 104 and/or the communication links 103 from the production playback devices 110 and/or the computing devices 106 of the cloud network 102.

In some examples, transfer of settings is optional. The control device 730 may display a prompt to transfer settings to the replacement production playback device(s) 110. For instance, the control device 730 may display user interface 833*e* (FIG. 8E) and initiate transfer of settings if the selectable control 879*e* is selected. Conversely, if the selectable control 879*d* is selected, the replacement production playback device(s) 110 include default settings.

Figure 13:
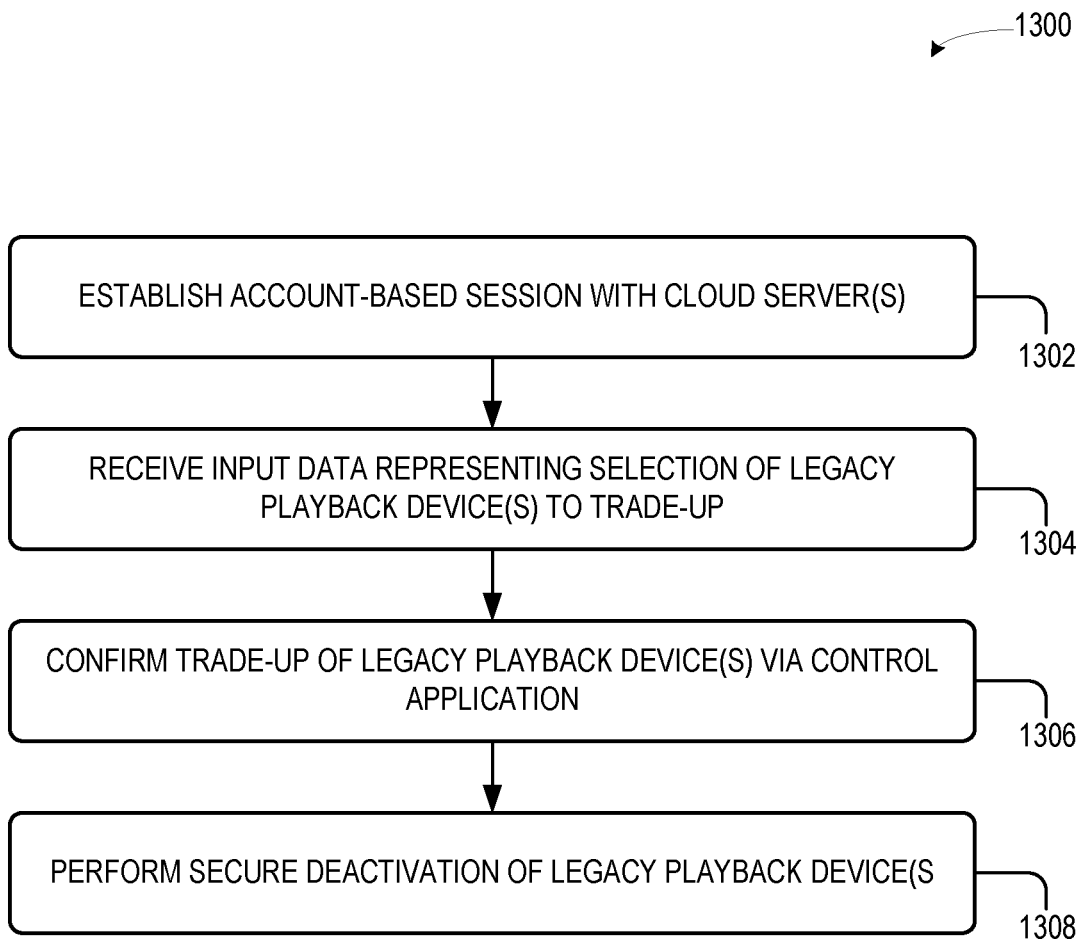
FIG. 13 shows an example technique to facilitate secure trade-up of legacy playback devices.

FIG. 13 is a flow diagram showing an example method 1300 to facilitate secure permanent deactivation of one or more legacy playback device(s). In particular, method 1300 involves at least (i) access to a user account that the playback device(s) to be deactivated is on and (ii) access for controlling playback of the media playback system that the playback device(s) to be deactivated are a part of At block 1302, the method 1300 involves establishing an account-based session with one or more cloud servers. For instance, a computing device, such as the control device 130, may establish the account-based session with the computing devices 106 of the cloud network 102 via an application (e.g., the legacy control application 732*a* or the production control application 732*b*) or via a browser and web site. A user account (or profile) includes data indicating the identity of the user (e.g., name, address, email address, etc.), their registered media playback system (e.g., the media playback system 100), as well as the playback devices 110 in the media playback system.

For instance, a web site may receive data representing credentials (e.g., user name and password) of a user profile registered with the media playback system 100, which may be provided by a user to a web site during log-in. After receiving valid credentials, the computing devices 106 may establish a secure session between the web site and the browser, perhaps using a HTTPS connection. Other types of secure sessions may be implemented in alternative examples.

Returning to FIG. 13, at block 1304, the method 1300 involves receiving input data representing a selection of legacy playback device(s) to trade-up. For instance, continuing the web site example above, using the computing device, the user may navigate to a web page that facilitates trade-up.

To illustrate, FIG. 14A shows an illustrative user interface 1433a. By way of example, the user interface 1433a is displayed in the form of a web page in a mobile browser, but other examples (e.g., a desktop browser or application) may be implemented as well. The user interface 1433a includes a graphical representation indicating that certain legacy playback device(s) 110 are available for a trade-up and that the legacy playback device(s) 110 will be permanently deactivated if selected for the trade-up.

The user interface 1433a further includes selectable regions 1483b and 1483c corresponding to respective legacy playback devices 110 (e.g., a "Play 5" playback device 110 in the "Den" zone and a Connect Amp playback device 110 in the "Garage" zone). In this example, the selectable regions 1483b and 1484c are toggleable to select and de-select the corresponding playback devices 110. Other examples are possible as well.

At block 1306, the method 1300 involves confirming the trade-up of legacy playback devices via a control application. As noted above, to prevent deactivation by bad actors, the secure deactivation process may require confirmation of the trade-up (and associated deactivation of the legacy playback devices 110) via a control application that is on the same network as the media playback system 100.

To illustrate, FIG. 14B shows an illustrative user interface 1433b to facilitate confirmation of a trade-up. In this example, the user interface 1433b is displayed in the legacy control application 732a, but the user interface 1433b may alternatively be displayed in the production control application 732b. The user interface 1433b includes a graphical representation 1485a prompting the user to confirm that they would like to trade-up the legacy playback device(s) 110 indicated in the graphical region 1485b. The user interface 1433b also includes a graphical representation 1485c with a warning that the trade-up involves permanent deactivation of the legacy playback device(s) 110 indicated in the graphical region 1485b. To confirm the deactivation, the selectable control 1485d is selected. The selectable control 1485e is selectable to cancel the trade-up and associated deactivation.

Referring again to FIG. 13, at block 1308, the method 1300 involves performing the secure deactivation of the legacy playback devices. For instance, after selectable control 1485d (or similar) is selected, data representing the request to deactivate the legacy playback device(s) 110 is transmitted to the computing devices 106. The computing devices 106 may then transmit back a deactivation command to the media playback system 100, which causes deactivation of the legacy playback device(s) 110.

V. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A method of controlling a media playback system comprising a first playback device and a second playback device, the method comprising: displaying, via a legacy control application installed on a mobile device, a first control interface comprising first playback controls operable to control the first playback device in performing a set of legacy playback functions, wherein the first playback device comprises legacy player software compatible with the set of legacy playback functions supported by the legacy control application, and wherein the first playback device is hardware-compatible with production player software compatible with a set of production playback functions supported by a production control application, and wherein the legacy playback functions are a subset of the production playback functions; receiving, via the first playback controls of the displayed first control interface, input data representing a command to perform a first legacy playback function; sending, via a network interface to the first playback device, instructions to perform the first legacy playback function; displaying, via the legacy control application installed on the mobile device, a second control interface comprising second playback controls operable to control the second playback device in performing the set of legacy playback functions, wherein the second playback device comprises the legacy player software compatible with the set of legacy playback functions supported by the legacy control application, and wherein the second playback device is hardware-compatible with the legacy player software and hardware-incompatible with the production player software; receiving, via the second playback controls of the displayed second control interface, input data representing a command to perform a second legacy playback function; and sending, via a network interface to the second playback device, instructions to perform the second legacy playback function.

Example 2: The method of example 1, further comprising: receiving input data representing a command to migrate the media playback system to the production player software; based on receiving the input data representing a command to migrate the media playback system to the production player software, sending, via the network interface, one or more instructions to migrate the media playback system to the production player software, wherein sending the one or more instructions to migrate the media playback system to the production player software comprises sending, to the first playback device, at least one instruction to replace the legacy player software with the production player software; and after the production player software is installed on the first playback device, displaying, via the production control application installed on the mobile device, a first control interface comprising first playback controls operable to control the first playback device in performing the set of production playback functions.

Example 3: The method of example 2, wherein migrating the media playback system to the production player software comprises removing the first playback device from the media playback system, and wherein the production control application excludes second playback controls operable to control the second playback device in performing the set of production playback functions.

Example 4: The method of any of examples 2-3, further comprising: after migrating to the production player software, displaying, via the legacy control application installed on the mobile device, the first control interface comprising first playback controls operable to control the first playback device in performing the set of legacy playback functions; receiving, via the first playback controls of the displayed first control interface, input data representing a command to perform a second legacy playback function; and sending, via the network interface to the first playback device, instructions to perform the second legacy playback function.

Example 5: The method of any of examples 2-4, further comprising: after migrating the media playback system to the production player software, adding a third playback device to the media playback system, wherein the third playback device is hardware-compatible with the production player software compatible and hardware-incompatible with the legacy player software; and displaying, via the production control application installed on the mobile device, a third control interface comprising third playback controls operable to control the third playback device in performing the set of production playback functions.

Example 6: The method of example 5, further comprising: after migrating to the production player software, receiving input data representing a command to revert the media playback system to the legacy player software; based on receiving the input data representing a command to revert the media playback system to the legacy player software, sending, via the network interface to the first playback device, one or more instructions to replace the production player software with the legacy player software, wherein reverting the media playback system to the legacy player software comprises: (i) adding the second playback to the media playback system and (ii) removing the third playback device form the media playback system; and after the legacy player software is installed on the first playback device, displaying, via the legacy control application installed on the mobile device, (i) the first control interface comprising the first playback controls operable to control the first playback device in performing the set of legacy playback functions and (ii) the second control interface comprising the second playback controls operable to control the second playback device in performing the set of legacy playback functions.

Example 7: The method of any of examples 2-6, wherein the media playback system is a first media playback system, the method further comprising: after migrating to the production player software on the first media playback system, receiving, via the legacy control application, input data representing a command to form a second media playback system; and sending, via the network interface to the second playback device, instructions to join the second media playback system, wherein the second playback device comprises the legacy player software compatible with the set of legacy playback functions supported by the legacy control application.

Example 8: The method of any of examples 1-7, wherein the set of legacy playback functions include playing back media items from data storage on a local area network and a line-in and exclude playing back media items from servers of at least one streaming audio service, and wherein the set of production playback functions include playing back media items from the servers of the at least one streaming audio service.

Example 9: The method of any of examples 1-8, wherein the set of legacy playback functions include forming synchrony groups among playback devices that are hardware-compatible with the legacy player software and exclude forming synchrony groups among playback devices that are hardware-incompatible with the legacy player software, and wherein the set of production playback functions include forming synchrony groups among playback devices that are hardware-compatible with the production player software.

Example 10: The method of any of examples 1-9, wherein the set of legacy playback functions include adding playback devices to the media playback system that are hardware-compatible with the legacy player software and exclude adding playback devices to the media playback system that are hardware-incompatible with the legacy player software, and wherein the set of production playback functions include adding playback devices to the media playback system that are hardware-compatible with the production player software.

Example 11: A mobile device configured to perform the method of any of examples 1-10.

Example 12: A non-transitory computer-readable medium storing instructions, that when executed by one or more processors, cause a device to perform the method of any of examples 1-10.

Example 13: A system configured to perform the method of any of examples 1-10.

What is claimed is:

1. A method of controlling a first media playback system comprising a first playback device and a second playback device, the method comprising:

displaying, via a legacy control application installed on a mobile device, a first control interface comprising first playback controls operable to control the first playback device in performing a set of legacy playback functions, wherein the first playback device comprises legacy player software compatible with the set of legacy playback functions supported by the legacy control application, wherein the set of legacy playback functions include forming synchrony groups among playback devices that are hardware-compatible with the legacy player software and exclude forming synchrony groups among playback devices that are hardware-incompatible with the legacy player software;

receiving, via the legacy control application, input data representing a command to migrate the first media playback system to production player software;

based on receiving the input data representing a command to migrate the first media playback system to the production player software: (i) determining that the first playback device is hardware-compatible with the production player software, wherein the production player software is compatible with a set of production playback functions supported by a production control application and (ii) determining that the second playback device is hardware-incompatible with the production player software, wherein the legacy playback functions are a subset of the production playback functions, and wherein the set of production playback functions include forming synchrony groups among playback devices that are hardware-compatible with the production player software;

based on determining that the first playback device is hardware-compatible with the production player software, sending, via a network interface, one or more instructions to migrate the first media playback system to the production player software, wherein sending the one or more instructions to migrate the first media playback system to the production player software comprises sending, to the first playback device, at least one instruction to replace the legacy player software with the production player software;

based on determining that the second playback device is hardware-incompatible with the production player software, sending, via the network interface, instructions to form a second media playback system comprising the second playback device, wherein the second playback device is hardware-compatible with the legacy player software;

after the second media playback system is formed, displaying, via the legacy control application installed on the mobile device, a second control interface comprising second playback controls operable to control the second playback device in performing the set of legacy playback functions, wherein the second playback device comprises the legacy player software compatible with the set of legacy playback functions supported by the legacy control application, wherein the legacy control application is configured to control only the second media playback system; and after the production player software is installed on the first playback device, displaying, via the production control application installed on the mobile device, a third control interface comprising third playback controls operable to control the first playback device in performing the set of production playback functions, wherein the production control application is configured to control only the first media playback system.

2. The method of claim 1, further comprising:

after migrating the first media playback system to the production player software, adding a third playback device to the first media playback system, wherein the third playback device is hardware-compatible with the production player software and hardware-incompatible with the legacy player software; and displaying, via the production control application installed on the mobile device, a fourth control interface comprising fourth playback controls operable to control the third playback device in performing the set of production playback functions.

3. The method of claim 2, further comprising:

after migrating the first media playback system to the production player software, receiving input data representing a command to revert the first media playback system to the legacy player software;

based on receiving the input data representing a command to revert the second media playback system to the legacy player software, sending, via the network interface to the first playback device, one or more instructions to replace the production player software with the legacy player software, wherein reverting the first media playback system to the legacy player software comprises: (i) adding the second playback device to the second media playback system and (ii) removing the third playback device from the first media playback system; and after the legacy player software is installed on the first playback device, displaying, via the legacy control application installed on the mobile device, (i) the first control interface comprising the first playback controls operable to control the first playback device in performing the set of legacy playback functions and (ii) the second control interface comprising the second playback controls operable to control the second playback device in performing the set of legacy playback functions.

4. The method of claim 1, wherein the set of legacy playback functions include playing back media items from data storage on a local area network and a line-in and exclude playing back media items from servers of at least one streaming audio service, and wherein the set of production playback functions include playing back media items from the servers of the at least one streaming audio service.

5. The method of claim 1, wherein the set of legacy playback functions include adding playback devices to the first media playback system that are hardware-compatible with the legacy player software and exclude adding playback devices to the first media playback system that are hardware-incompatible with the legacy player software, and wherein the set of production playback functions include adding playback devices to the second media playback system that are hardware-compatible with the production player software.

6. The method of claim 1, wherein the legacy player software comprises a first version of a kernel, and wherein the production player software comprises a second version of the kernel.

7. The method of claim 1, wherein forming synchrony groups among playback devices that are hardware-compatible with the legacy player software comprises forming at least one of (a) legacy bonded zones configured to play respective channels of first audio in synchrony or (b) legacy zone groups configured to play back the first audio in synchrony, and wherein forming synchrony groups among playback devices that are hardware-compatible with the production player software comprises forming at least one of (a) production bonded zones configured to play respective channels of second audio in synchrony or (b) production zone groups configured to play back the second audio in synchrony.

8. A first media playback system comprising:
a first playback device;
a second playback device;
a mobile device comprising at least one processor and at least one non-transitory, computer-readable medium comprising instructions that are executable by the mobile device such that the mobile device is configured to:
  display, via a legacy control application installed on a mobile device, a first control interface comprising first playback controls operable to control the first playback device in performing a set of legacy playback functions, wherein the first playback device comprises legacy player software compatible with the set of legacy playback functions supported by the legacy control application, wherein the set of legacy playback functions include forming synchrony groups among playback devices that are hardware-compatible with the legacy player software and exclude forming synchrony groups among playback devices that are hardware-incompatible with the legacy player software;
  receive, via the legacy control application, input data representing a command to migrate the first media playback system to production player software;
  based on receipt of the input data representing a command to migrate the first media playback system to the production player software: (i) determine that the first playback device is hardware-compatible with the production player software, wherein the production player software is compatible with a set of production playback functions supported by a production control application and (ii) determine that the second playback device is hardware-incompatible with the production player software, wherein the legacy playback functions are a subset of the production playback functions, and wherein the set of production playback functions include forming synchrony groups among playback devices that are hardware-compatible with the production player software;
  based on the determination that the first playback device is hardware-compatible with the production player software, send, via a network interface, one or more instructions to migrate the first media playback system to the production player software, wherein the instructions executable to by the at least one processor such that the mobile device is configured to send sending the one or more instructions to migrate the first media playback system to the production player software comprise instructions executable to by the at least one processor such that the mobile device is configured to send, to the first playback device, at least one instruction to replace the legacy player software with the production player software;
  based on the determination that that the second playback device is hardware-incompatible with the production player software, send, via the network interface, instructions to form a second media playback system comprising the second playback device, wherein the second playback device is hardware-compatible with the legacy player software;
  after the second media playback system is formed, display, via the legacy control application installed on the mobile device, a second control interface comprising second playback controls operable to control the second playback device in performing the set of legacy playback functions, wherein the second playback device comprises the legacy player software compatible with the set of legacy playback functions supported by the legacy control application, wherein the legacy control application is configured to control only the second media playback system; and
  after the production player software is installed on the first playback device, display, via the production control application installed on the mobile device, a third control interface comprising third playback controls operable to control the first playback device in performing the set of production playback functions, wherein the production control application is configured to control only the first media playback system.

9. The first media playback system of claim 8, further comprising a third playback device, wherein the instructions are executable by the mobile device such that the mobile device is further configured to:
after migration of the first media playback system to the production player software, add a third playback device to the first media playback system, wherein the third playback device is hardware-compatible with the production player software and hardware-incompatible with the legacy player software; and
display, via the production control application installed on the mobile device, a fourth control interface comprising fourth playback controls operable to control the third playback device in performing the set of production playback functions.

10. The first media playback system of claim 9, wherein the instructions are executable by the mobile device such that the mobile device is further configured to:
after migration of the first media playback system to the production player software, receive input data representing a command to revert the first media playback system to the legacy player software;
based on receipt of the input data representing a command to revert the second media playback system to the legacy player software, send, via the network interface to the first playback device, one or more instructions to replace the production player software with the legacy player software, wherein reverting the first media playback system to the legacy player software comprises: (i) adding the second playback device to the second media playback system and (ii) removing the third playback device from the first media playback system; and after the legacy player software is installed on the first playback device, display, via the legacy control application installed on the mobile device, (i) the first control interface comprising the first playback controls operable to control the first playback device in performing the set of legacy playback functions and (ii) the second control interface comprising the second playback controls operable to control the second playback device in performing the set of legacy playback functions.

11. The first media playback system of claim 8, wherein the set of legacy playback functions include playing back media items from data storage on a local area network and a line-in and exclude playing back media items from servers of at least one streaming audio service, and wherein the set of production playback functions include playing back media items from the servers of the at least one streaming audio service.

12. The first media playback system of claim 8, wherein the legacy player software comprises a first version of a kernel, and wherein the production player software comprises a second version of the kernel.

13. The first media playback system of claim 8, wherein forming synchrony groups among playback devices that are hardware-compatible with the legacy player software comprises forming at least one of (a) legacy bonded zones configured to play respective channels of first audio in synchrony or (b) legacy zone groups configured to play back the first audio in synchrony, and wherein forming synchrony groups among playback devices that are hardware-compatible with the production player software comprises forming at least one of (a) production bonded zones configured to play respective channels of second audio in synchrony or (b) production zone groups configured to play back the second audio in synchrony.

14. Tangible, non-transitory computer-readable media comprising instructions that are executable by at least one processor of a mobile device such that the mobile device is configured to:

display, via a legacy control application installed on a mobile device, a first control interface comprising first playback controls operable to control a first playback device of a first media playback system in performing a set of legacy playback functions, wherein the first playback device comprises legacy player software compatible with the set of legacy playback functions supported by the legacy control application, wherein the set of legacy playback functions include forming synchrony groups among playback devices that are hardware-compatible with the legacy player software and exclude forming synchrony groups among playback devices that are hardware-incompatible with the legacy player software;

receive, via the legacy control application, input data representing a command to migrate the first media playback system to production player software;

based on receipt of the input data representing a command to migrate the first media playback system to the production player software: (i) determine that the first playback device is hardware-compatible with the production player software, wherein the production player software is compatible with a set of production playback functions supported by a production control application and (ii) determine that a second playback device of the first media playback system is hardware-incompatible with the production player software, wherein the legacy playback functions are a subset of the production playback functions, and wherein the set of production playback functions include forming synchrony groups among playback devices that are hardware-compatible with the production player software;

based on the determination that the first playback device is hardware-compatible with the production player software, send, via a network interface, one or more instructions to migrate the first media playback system to the production player software, wherein the instructions executable to by the at least one processor such that the mobile device is configured to send sending the one or more instructions to migrate the first media playback system to the production player software comprise instructions executable to by the at least one processor such that the mobile device is configured to send, to the first playback device, at least one instruction to replace the legacy player software with the production player software;

based on the determination that that the second playback device is hardware-incompatible with the production player software, send, via the network interface, instructions to form a second media playback system comprising the second playback device, wherein the second playback device is hardware-compatible with the legacy player software;

after the second media playback system is formed, display, via the legacy control application installed on the mobile device, a second control interface comprising second playback controls operable to control the second playback device in performing the set of legacy playback functions, wherein the second playback device comprises the legacy player software compatible with the set of legacy playback functions supported by the legacy control application, wherein the legacy control application is configured to control only the second media playback system; and after the production player software is installed on the first playback device, display, via the production control application installed on the mobile device, a third control interface comprising third playback controls operable to control the first playback device in performing the set of production playback functions wherein the production control application is configured to control only the first media playback system.

15. The tangible, non-transitory computer-readable media of claim 14, wherein the instructions are executable by the mobile device such that the mobile device is further configured to:

after migrating the first media playback system to the production player software, add a third playback device to the second media playback system, wherein the third playback device is hardware-compatible with the production player software and hardware-incompatible with the legacy player software; and display, via the production control application installed on the mobile device, a fourth control interface comprising fourth playback controls operable to control the third playback device in performing the set of production playback functions.

16. The tangible, non-transitory computer-readable media of claim 15, wherein the instructions are executable by the mobile device such that the mobile device is further configured to:
- after migrating the first media playback system to the production player software, receive input data representing a command to revert the first media playback system to the legacy player software;
- based on receipt of the input data representing a command to revert the second media playback system to the legacy player software, send, via the network interface to the first playback device, one or more instructions to replace the production player software with the legacy player software, wherein reverting the first media playback system to the legacy player software comprises: (i) adding the second playback device to the second media playback system and (ii) removing the third playback device from the first media playback system; and
- after the legacy player software is installed on the first playback device, display, via the legacy control application installed on the mobile device, (i) the first control interface comprising the first playback controls operable to control the first playback device in performing the set of legacy playback functions and (ii) the second control interface comprising the second playback controls operable to control the second playback device in performing the set of legacy playback functions.

17. The tangible, non-transitory computer-readable media of claim 14, wherein the set of legacy playback functions include playing back media items from data storage on a local area network and a line-in and exclude playing back media items from servers of at least one streaming audio service, and wherein the set of production playback functions include playing back media items from the servers of the at least one streaming audio service.

18. The tangible, non-transitory computer-readable media of claim 14, wherein the set of legacy playback functions include adding playback devices to the first media playback system that are hardware-compatible with the legacy player software and exclude adding playback devices to the first media playback system that are hardware-incompatible with the legacy player software, and wherein the set of production playback functions include adding playback devices to the second media playback system that are hardware-compatible with the production player software.

19. The tangible, non-transitory computer-readable media of claim 14, wherein the legacy player software comprises a first version of a kernel, and wherein the production player software comprises a second version of the kernel.

20. The tangible, non-transitory computer-readable media of claim 14, wherein forming synchrony groups among playback devices that are hardware-compatible with the legacy player software comprises forming at least one of (a) legacy bonded zones configured to play respective channels of first audio in synchrony or (b) legacy zone groups configured to play back the first audio in synchrony, and wherein forming synchrony groups among playback devices that are hardware-compatible with the production player software comprises forming at least one of (a) production bonded zones configured to play respective channels of second audio in synchrony or (b) production zone groups configured to play back the second audio in synchrony.

* * * * *

UNITED STATES PATENT AND TRADEMARK OFFICE
CERTIFICATE OF CORRECTION

PATENT NO. : 11,416,210 B2
APPLICATION NO. : 16/435130
DATED : August 16, 2022
INVENTOR(S) : Elliot et al.

It is certified that error appears in the above-identified patent and that said Letters Patent is hereby corrected as shown below:

In the Claims

In Column 46, in Claim 8, Line 14, delete "that that" and insert -- that --, therefor.

In Column 48, in Claim 14, Line 27, delete "that that" and insert -- that --, therefor.

Signed and Sealed this
Fifteenth Day of November, 2022

Katherine Kelly Vidal
*Director of the United States Patent and Trademark Office*